(12) United States Patent
Nagaoka

(10) Patent No.: US 6,256,155 B1
(45) Date of Patent: Jul. 3, 2001

(54) OBJECTIVE OPTICAL SYSTEM

(75) Inventor: Toshiyuki Nagaoka, Akishima (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/391,183

(22) Filed: Sep. 7, 1999

(30) Foreign Application Priority Data

Sep. 11, 1998 (JP) .................................................. 10-274304

(51) Int. Cl.$^7$ ............................. G02B 13/04; G02B 9/60; G02B 9/34; G02B 17/00
(52) U.S. Cl. ......................... 359/753; 359/770; 359/781; 359/737; 359/726
(58) Field of Search .................................. 359/726, 737, 359/739, 753, 770, 781, 656, 659, 661

(56) References Cited

U.S. PATENT DOCUMENTS

| | | | |
|---|---|---|---|
| 3,901,220 | * 8/1975 | Koyasu et al. | 600/176 |
| 4,042,295 | * 8/1977 | Yamasita et al. | 359/735 |
| 4,059,344 | * 11/1977 | Yamasita | 359/735 |
| 4,138,192 | * 2/1979 | Yamasita | 359/726 |
| 4,598,980 | * 7/1986 | Doi et al. | 359/735 |
| 4,684,224 | * 8/1987 | Yamashita et al. | 359/735 |
| 4,735,491 | * 4/1988 | Takahashi | 359/652 |
| 4,746,203 | * 5/1988 | Nishioka et al. | 359/834 |

FOREIGN PATENT DOCUMENTS

| | | | |
|---|---|---|---|
| 3214544 A1 | * 11/1982 | (DE) | G02B/13/04 |
| 37-9530 | * 7/1963 | (JP) . | |
| 2-69710 | * 3/1990 | (JP) . | |
| 5-307139 | * 11/1993 | (JP) . | |

* cited by examiner

Primary Examiner—Georgia Epps
Assistant Examiner—David N. Spector
(74) Attorney, Agent, or Firm—Arnold International; Bruce Y. Arnold

(57) ABSTRACT

An objective optical system is disclosed having, in a first construction, in relative order from the object side, a first lens element of negative refractive power, a visual field conversion optical element which folds light rays incident thereon, a stop, and either one or two additional lens elements of positive refractive power which form an objective optical system. Certain prescribed conditions are satisfied in order that the objective optical system be compact and have acceptably small aberrations to thereby enable a high quality image to be formed. In a second alternative construction, the stop is positioned after the second lens element and the third lens element includes a convex surface on the image side and satisfies a prescribed condition. In a third alternative construction, an objective optical system is disclosed having, in relative order from the object side, a visual field conversion optical element which folds light rays incident thereon, a first lens element of positive or negative refractive power, a stop, and a second lens element of positive refractive power with a convex surface on the image side, wherein the second lens element satisfies a certain prescribed condition. In the second and third constructions, the system may be formed in two parts, an adaptor unit and a master unit, which are detachable from one another. The invention is particularly well-suited for forming images for an image pick-up element having pixels as small as 5 micrometers or less.

21 Claims, 24 Drawing Sheets

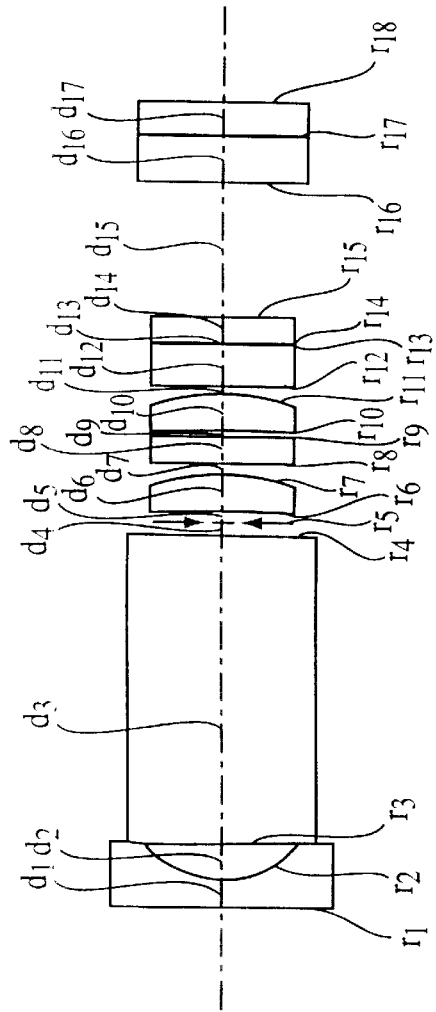
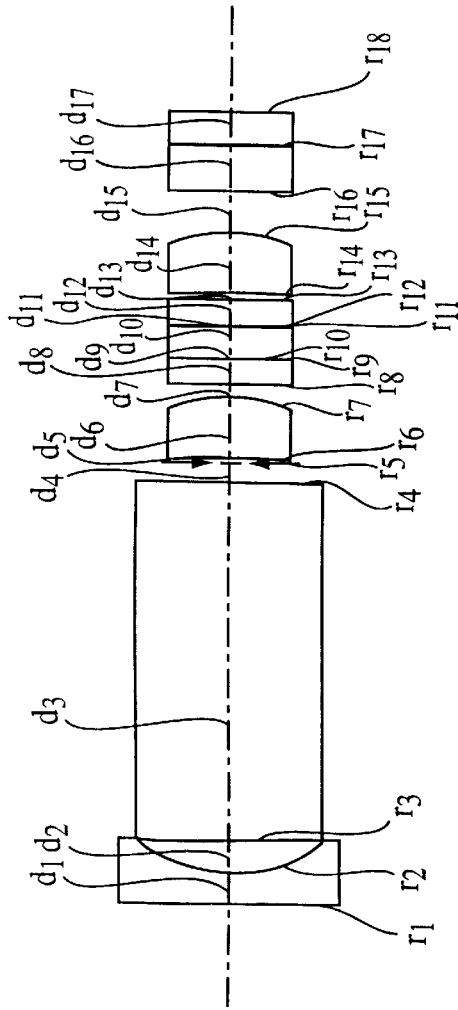
FIG. 1
FIG. 2

OBJECTIVE OPTICAL SYSTEM

BACKGROUND OF THE INVENTION

In recent years, image pick-up elements such as CCD devices have achieved high resolution and become compact as a result of advances in fine pattern technology which have enabled the pick-up element pixel size to be reduced. As a result of these advances, highly efficient and much smaller-sized objective optical systems have been in demand in optical systems which employ such image pick-up elements as, for example, endoscope systems. Especially in the case where an optical system employs, for example, a beam-folding prism or mirror which serves as a visual beam conversion element to provide a side or perspective view, there is the tendency for the entire optical system to become large as compared with an optical system that provides only a direct view. Thus, a size-reduction in such an optical system is desired. Moreover, while small size and high performance of an optical system are desired, nevertheless, an inexpensive objective optical system with three or fewer lens elements is also desired.

As a prior art example of an objective optical system that uses a visual field conversion optical element, the optical system described in Japanese Laid Open Patent Application No. H2-69710 is known. This prior art optical system combines a negative lens element, a visual field conversion optical element, a positive lens element and a positive lens element. However, since the refractive power of the negative lens element is weak, the correction of field curvature is insufficient. Moreover, since the Abbe number of a positive lens element is small, the amount of chromatic aberration is large.

Another prior art example of an objective optical system that uses a visual field conversion optical element is disclosed in Japanese Laid Open Patent Application No. H5-307139. This optical system consists of a negative lens element, a visual field conversion optical element, a positive lens element, and a positive lens element. However, the refractive index of the negative lens element is small and the generation of lateral color is large.

Another prior art example of a visual field conversion optical element is disclosed in Japanese Laid Open Patent Application No. 37-9530.

BRIEF SUMMARY OF THE INVENTION

This invention is an objective optical system for use with, for example, an endoscope. A first object of the invention is to provide an objective optical system that includes a visual field conversion optical element which folds the rays at least once. Such an optical element enables a side or perspective view in an optical system which is reduced in size as compared with prior art systems employing a visual field conversion optical element. A second object of the invention is to provide a visual field conversion optical element within an objective optical system that yields a high-quality image at low cost by employing in the objective optical system, at most, three lens elements that can be made of inexpensive materials.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1 shows the lens element construction of Embodiment 1,

FIG. 2 shows the lens element construction of Embodiment 2,

DETAILED DESCRIPTION

Figure 3:
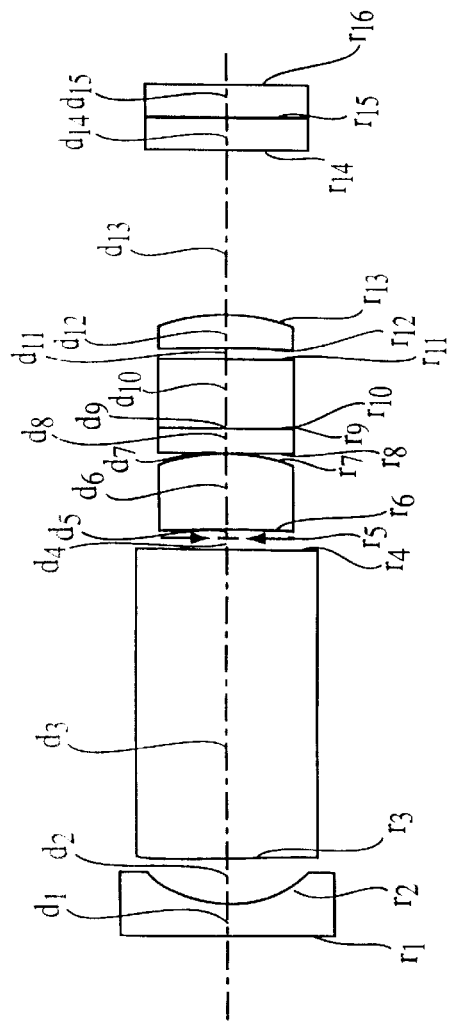
FIG. 3 shows the lens element construction of Embodiment 3.

This invention is an objective optical system which includes a visual field-of-view conversion optical element (hereinafter termed a visual field conversion optical element) which may be formed, for example, by a beam-folding prism or mirror and which serves to provide a side or perspective view. Such an optical system can be used for various image pick-up systems, such as an endoscope, a video camera, a digital camera, and a conventional camera using silver-salt film. A visual field conversion optical element folds the light one or more times prior to the light being incident onto an image pick-up system, thereby enabling side or perspective viewing. Of course, the system of the present invention can be combined with a direct-view optical element, as well as with one or more additional visual field conversion optical elements in order to provide a view field that is nearly unlimited in extent. The present invention provides an objective optical system which includes a small-sized, highly efficient visual field conversion optical element, an aperture which serves as a stop, and additionally, either two or three lens elements (i.e., individual masses of optical material having optical power).

In the case where there are three lens elements, the relative arrangement of these components is, in order from the object side: a first lens element of negative refractive power, a visual field conversion optical element, a stop, a second lens element of positive refractive power, and a third lens element of positive refractive power. The surface at the image-side of the third lens element is convex, and the following Condition (1) is satisfied.

$$0.1 < |R_{(3R)}/f| < 20 \qquad \text{Condition (1)}$$

where $R_{(3R)}$ is the radius of curvature of the image-side surface of the third lens element, and f is the focal distance of the objective optical system.

For example, an objective optical system for an endoscope that provides a view field that includes a side or a perspective view requires that the image angle (i.e., picture angle) should be about 80 degrees or more. Thus, when an objective optical system having a visual field conversion optical element and a stop is composed of three lens elements, it is desirable that the relative order of the lens elements be as stated above, so that the optical system is of the retro-focus type.

In the case where there are only two lens elements, it is also desirable that the optical system be of the retro-focus type. This is accomplished by having the relative arrangement of the above components be, in order from the object side: a negative lens element, a visual field conversion optical element, a stop, and a positive lens element. However, this arrangement provides an asymmetrical refractive power relative to the stop. For this reason, the generation of aberrations such as astigmatism, coma, and lateral color tends to be large. In order to make the objective optical system more compact, the refractive power of each lens element needs to be strengthened. Therefore, the aberrations generated by each lens element become larger, and it becomes difficult to maintain high image-formation quality. In order to better correct aberrations, the surface at the image-side of the third lens element is made convex in a manner which satisfies the above-mentioned Condition (1).

When Condition (1) is satisfied, aberrations will be well-corrected, and this is especially the case with coma. If the absolute value of the ratio $R_{(3R)}/f$ is 0.1 or less, the refractive power of image-side surface of the third lens element will be too strong, resulting in the generation of excessive aberrations. Moreover, if the absolute value of the ratio $R_{(3R)}/f$ is 20 or more, the refractive power of the image-side surface of the third lens element will be too weak, and it will be difficult to make the objective optical system compact.

In addition, it is preferred that the following Conditions (2) and (3) be satisfied.

$$\nu(p) > 42 \qquad \text{Condition (2)}$$

$$N_1 > 1.6 \qquad \text{Condition (3)}$$

where $\nu(p)$ is the Abbe number of a lens element of positive refractive power, and $N_1$ is the refractive index of the first lens element, in order from the object side.

In the optical system using an image pick-up element such as a CCD device, vignetting (i.e., limb-darkening) and color effects resulting from light rays which are incident at oblique angles to the surface of an image pick-up element need to be prevented. Therefore, it is desirable that the incident light rays strike the image pick-up surface perpendicularly. Where there are three lens elements, it is desirable that the image-side surface of the third lens element be convex. This assists in making the incident light rays strike the image pick-up surface perpendicularly. However, when the surface at the image-side of the third lens element is made convex, correction of aberrations, especially lateral color, generated by this surface becomes difficult.

In order to correct these aberrations, at least one of the positive lens elements must satisfy Condition (2). If Condition (2) is not satisfied, i.e., if the Abbe number $\nu(p)$ of a lens element with positive refractive power does not exceed 42, correction of lateral color will be difficult.

Condition (3) controls the generation of aberrations. By satisfying Condition (3), the refractive index of the first lens element, in order from the object side, is made sufficient to ensure that the aberrations generated by this lens element are small. In other words, if the refractive index of the first lens element exceeds 1.6, the aberrations generated by the first lens element can be sufficiently corrected. The stop is desirable positioned between the visual field conversion optical element and the second lens element.

It is also desirable if the following Condition (4) is satisfied.

$$0.1 < R_{(1R)}/f < 3 \qquad \text{Condition (4)}$$

where $R_{(1R)}$ is the radius of curvature of the image-side surface of the first lens element, and f is as defined above.

Condition (4) limits the aberrations generated by the image-side surface of the first lens element, in order from the object side. If the value of $R_{(1R)}/f$ is 0.1 or less, the aberrations generated by the first lens element will be too large. If the value of $R_{(1R)}/f$ is 3 or more, the refractive power of the first lens element will be too weak, resulting in it being difficult to make the objective lens system compact.

It is also desirable if the following Condition (5) is satisfied.

$$0.05 < |f/f_1| < 5 \qquad \text{Condition (5)}$$

where f is as defined above, and $f_1$ is the focal distance of the first lens element.

Condition (5) also controls aberrations that are generated by the objective optical system of the invention. If the absolute value of the ratio $f/f_1$ is 0.05 or less, the refractive power of the first lens element will be too large and it will be difficult to satisfactorily correct the aberration outside an axis in the whole system. Moreover, if the absolute value of the ratio $f/f_1$ is 5 or more, it will be difficult to make the objective optical system compact.

An infrared cut-off filter may be used between the stop and the image surface. When the objective optical system of this invention is used with an image pick-up element which has a sensitivity to some extent to infrared wavelengths, such as CCD, an infrared cut-off filter is needed. However, when an infrared cut-off filter is used, the resulting difference of optical path length in the infrared cut-off filter between the light rays on-axis and off-axis will be large. This results in a disadvantage in that the coloring will be different at the center if the screen verses the peripheral areas of the screen. In the objective optical system of this invention, it is desirable to use an infrared cut-off filter between the image surface and a stop at an axial position where the difference in angle between on-axis and off-axis light rays is small.

It is also desirable if the following Condition (6) is satisfied.

$$1 < Dp/f < 10 \qquad \text{Condition (6)}$$

where

Dp is the air conversion length from the image-side surface of the first lens element to the stop, and f is as defined previously.

If the lower-limit value of Condition (6) is not satisfied, the construction configuration of a visual field conversion optical element will be difficult. Moreover, if the upper limit of Condition (6) is not satisfied, it will be difficult to make the whole system compact.

In order to correct the aberrations satisfactorily, when the image-side surface of the lens element nearest the image side is made into a convex shape, it is especially important that Condition (1) be satisfied when the pixel size of the image pick-up element of a CCD device is 5 micrometers or less. Moreover, it is desirable if the outer diameter of the lens element nearest the image side is 3 mm or less. Moreover, in order to make a much more favorable image-formation capability, it is desirable to satisfy the following Condition (1-1) instead of Condition (1).

$$0.5 < |R_{(3R)}/f| < 15 \qquad \text{Condition (1-1)}$$

In order to satisfactorily correct the lateral chromatic aberration, at least one lens element surface among the lens elements on the image-side of the stop should desirable satisfy Condition (2). It is important that Condition (2) be satisfied when the pixel size of the image pick-up element of a CCD device is 5 micrometers or less. Moreover, satisfaction of Condition (2) is especially important when the outer diameter of the lens element nearest the image side is 3 mm or less. However, in order to obtain an objective optical system with a much more favorable image-formation capability, it is desirable to satisfy the following Condition (2-1) in lieu of merely satisfying Condition (2).

$$\nu(p) > 45 \qquad \text{Condition (2-1)}$$

In order to correct aberrations satisfactorily, it is desirable that the image-side surface of the first lens element (i.e., the negative lens element) satisfies Condition (3). Satisfaction of Condition (3) is important when the pixel size of the image pick-up element (such as a CCD device) is 5 micrometers or less. Moreover, satisfaction of Condition (3) is especially important when the outer diameter of the lens element nearest the image is 3 mm or less. However, in order to obtain an objective optical system with a more favorable image-formation capability, it is desirable to satisfy the following Condition (3-1) in lieu of merely satisfying Condition (3).

$$N_1 > 1.7 \qquad \text{Condition (3-1)}$$

In order to satisfactorily correct aberrations, it is desirable that the negative lens element satisfies Condition (4). The satisfaction of Condition (4) is important when the pixel size of the image pick-up element (such as a CCD device) is 5 micrometers or less. Moreover, satisfaction of this condition is especially important when the outer diameter of the lens element nearest the image is 3 mm or less. However, in order to obtain an objective optical system which has a much more favorable image-formation capability, it is desirable to satisfy the following Condition (4-1) in lieu of merely satisfying Condition (4).

$$0.5 < R_{(1R)}/f < 3 \qquad \text{Condition (4-1)}$$

It is desirable that the first lens element (i.e., the negative lens element) satisfies Condition (5). Satisfaction of Condition (5) is important when the pixel size of the image pick-up element is 5 micrometers or less. Moreover, satisfaction of Condition (5) is especially important when the outer diameter of the lens element nearest the image is 3 mm or less. However, in order to obtain an optical system which has a more favorable image-formation capability, it is desirable to satisfy the following Condition (5-1) in lieu of merely satisfying Condition (5).

$$0.1 < |f/f_1| < 3 \qquad \text{Condition (5-1)}$$

In order to make the objective optical system of this invention compact, it is desirable to satisfy above-mentioned Condition (6). Satisfaction of Condition (6) is important when the pixel size of the image pick-up element is 5 micrometers or less. Moreover, satisfaction of Condition (6) is especially important when the outer diameter of the lens element nearest the image is 3 mm or less. However, in order to make the objective optical system even more compact, it is desirable that the following Condition (6-1) be satisfied in lieu of merely satisfying Condition (6).

$$1.5 < Dp/f < 7 \qquad \text{Condition (6-1)}$$

When using the objective optical system of this invention with an endoscope system, it may be desirable that the object-side surface of the first lens element be a planar surface. A planar surface is advantageous from the point of view of making the object-side surface of the endoscope easy to clean. However, if priority is given to optical performance, the curvature on the object-side surface of the first lens element should be maintained. Further, in the optical system of this invention, in order to reduce cost, it is desirable to make the surface of one side of at least one positive lens element into a flat surface.

In order to make the objective optical system compact while satisfactorily correcting aberrations generated by the first lens element (i.e., the negative lens element), it is desirable to satisfy the following Condition (7).

$$0.4 \text{ mm} < R_{(1R)} < 3 \text{ mm} \qquad \text{Condition (7)}$$

where $R_{(1R)}$ is as defined above.

If the lower-limit value of Condition (7) is not satisfied, the refractive power of the first lens element will be too strong and it will be difficult to satisfactorily correct aberrations of the objective optical system. Moreover if the upper limit of Condition (7) is not satisfied, the refractive power of the first lens element will be too weak and it will be difficult to make the objective optical system compact. However, it is more desirable to satisfy the following Condition (7-1) in lieu of merely satisfying Condition (7).

$$0.6 \text{ mm} < R_{(1R)} < 2 \text{ mm} \qquad \text{Condition (7-1)}$$

Further, when at least one positive lens element includes a flat surface, it is desirable that the following Condition (8) be satisfied:

$$0.5 \text{ mm} < |R(p)| < 5 \text{ mm} \qquad \text{Condition (8)}$$

where $R(p)$ is the radius of curvature of the convex side of the positive lens element having its opposite side planar.

Condition (8) allows for the objective optical system to be compact, while ensuring that the aberrations generated by said positive lens element are small. If the lower-limit value of Condition (8) is not satisfied, the refractive power of the positive lens element will be too strong, and the correction of coma aberration will be difficult. Moreover, if the upper limit of Condition (8) is not satisfied, the refractive power of said positive lens element will be too weak and it will be difficult to make the objective optical system compact. However, it is more desirable if the following Condition (8-1) is satisfied in lieu of merely satisfying Condition (8).

$$0.8 \text{ mm} < |R(p)| < 3 \text{ mm} \qquad \text{Condition (8-1)}$$

The objective optical system of this invention is effective when pixel size of the image pick-up element (such as a CCD device) is 5 micrometers or less. However, it becomes more effective as the pixel size is reduced to 4 micrometers or less. Moreover, when the outer diameter of the lens element nearest the image side is 3 mm or less, the optical system of this invention is effective, and it is even more effective when the outer diameter of the lens element is 2.5 mm or less. Also, the objective optical system of this invention is effective when the length, width or height of a visual field conversion optical element is smaller than 5 mm. However, it is even more effective when the length, width, or height of a visual field conversion optical element is smaller than 3 mm.

Next, specific examples of the objective optical system of this invention will be described in the following embodiments of the invention, which are given for purposes of illustration only.

In Tables 1–36 which follow, # is the surface number in order from the object side, R is the radius of curvature (in mm) of the surface, D is the on-axis spacing (in mm) between surfaces, $N_d$ is refractive index and $v_d$ is the Abbe constant (at the sodium d-line) of each lens element. Moreover, f is the focal length of the objective optical system, $2\omega$ is the image angle, $F_{NO.}$ is the F-number, IH is image height, OB is distance of the object, and the other values listed are as defined above. Various color filters may be used in the objective optical system, depending on the application. Further, various filters for blocking specific laser wavelength ranges may be provided, such as light output by a YAG laser or a semiconductor laser. Such filters may be of the absorbing-type, such as an infrared cut-off filter, or may be of the interference-type. The function of these filters can be provided in, or on, various plane-parallel plates or, alternatively, may be instead be provided in, or on, the materials that form the lens elements.

Embodiment 1

FIG. 1 shows a retro-focus type objective optical system of Embodiment 1 which includes, in relative order from the object side: a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{10}$–$r_{11}$) of positive refractive power. In order from the object side, the first lens element is of a planar-concave shape, the second lens element is of a concave-convex shape, and the third lens element is of a concave-convex shape. Also, various filters which block specific wavelength ranges may be provided. In this embodiment, the plane-parallel plate ($r_8$–$r_9$) on the image-side of the second lens element is an interference-type filter, the plane-parallel plate ($r_{12}$–$r_{13}$) is an absorbing-type, infrared cut-off filter, and the plane-parallel plate ($r_{14}$–$r_{15}$) is an interference-type filter. Further, the two plane-parallel plates nearest the image are a cover glass ($r_{16}$–$r_{17}$) of a dust guard, and a cover glass ($r_{17}$–$r_{18}$) of an image pick-up element. The outer diameter of the positive lens elements in this embodiment is 2 mm.

TABLE 1

| # | R | D | $N_d$ | $v_d$ |
|---|---|---|---|---|
| 1 | ∞ | 0.4000 | 1.88300 | 40.76 |
| 2 | 1.3595 | 0.5430 | | |
| 3 | ∞ | 4.6880 | 1.88300 | 40.76 |
| 4 | ∞ | 0.1500 | | |
| 5 | ∞ (stop) | 0.2000 | | |
| 6 | −12.1267 | 0.4947 | 1.88300 | 40.76 |
| 7 | −2.6180 | 0.1735 | | |
| 8 | ∞ | 0.4000 | 1.52287 | 59.89 |
| 9 | ∞ | 0.1000 | | |
| 10 | −12.2163 | 0.5211 | 1.88300 | 40.76 |
| 11 | −3.3203 | 0.1500 | | |
| 12 | ∞ | 0.6200 | 1.51400 | 75.00 |

TABLE 1-continued

| # | R | D | $N_d$ | $v_d$ |
|---|---|---|---|---|
| 13 | ∞ | 0.0300 | | |
| 14 | ∞ | 0.4000 | 1.52287 | 59.89 |
| 15 | ∞ | 2.0182 | | |
| 16 | ∞ | 0.7000 | 1.51633 | 64.14 |
| 17 | ∞ | 0.5000 | 1.51633 | 64.14 |
| 18 | ∞ | | | | f = 1.103  2ω = 119.7°  $F_{NO.}$ = 4.95  IH = 1 mm  OB = 10 mm
$|R_{(3R)}/f|$ = 3.010  υ(p) = 40.76  $N_1$ = 1.883
$|R_{(1R)}/f|$ = 1.233  $|f/f_1|$ = 0.716  Dp/f = 2.885
$R_{(1R)}$ = 1.360

Embodiment 2

FIG. 2 shows Embodiment 2 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{14}$–$r_{15}$) of positive refractive power. In order from the object side, the first lens element is of a planar-concave shape, the second lens element is of a planar-convex shape, and the third lens element is of a concave-convex shape. Various filters for blocking specific wavelength ranges may be arranged within the objective optical system. For example, the plane-parallel plate ($r_8$–$r_9$) is an interference-type filter, the plane-parallel plate ($r_{10}$–$r_{11}$) is an absorbing-type, infrared cut-off filter, and the plane-parallel plate ($r_{12}$–$r_{13}$) is an interference-type filter. The two plane-parallel plates nearest the image are the cover glass ($r_{16}$–$r_{17}$) of a dust guard and the cover glass ($r_{17}$–$r_{18}$) of an image pick-up element, such as a CCD device. The outer diameter of the positive lens elements of this embodiment is 1.4 mm.

TABLE 2

| # | R | D | $N_d$ | $v_d$ |
|---|---|---|---|---|
| 1 | ∞ | 0.3500 | 1.88300 | 40.76 |
| 2 | 1.5663 | 0.4951 | | |
| 3 | ∞ | 4.0390 | 1.88300 | 40.76 |
| 4 | ∞ | 0.2000 | | |
| 5 | ∞ (stop) | 0.0500 | | |
| 6 | ∞ | 0.8529 | 1.51633 | 64.14 |
| 7 | −1.0730 | 0.1000 | | |
| 8 | ∞ | 0.3000 | 1.52287 | 59.89 |
| 9 | ∞ | 0.0300 | | |
| 10 | ∞ | 0.4000 | 1.51400 | 75.00 |
| 11 | ∞ | 0.0300 | | |
| 12 | ∞ | 0.3000 | 1.52287 | 59.89 |
| 13 | ∞ | 0.1000 | | |
| 14 | −8.4371 | 0.7068 | 1.88300 | 40.76 |
| 15 | −1.8070 | 0.6078 | | |
| 16 | ∞ | 0.5000 | 1.51633 | 64.14 |
| 17 | ∞ | 0.4000 | 1.51633 | 64.14 |
| 18 | ∞ | | | | f = 0.637  2ω = 100.4°  $F_{NO}$ = 4.16  IH = 0.5 mm  OB = 10 mm
$|R_{(3R)}/f|$ = 2.837  υ(p) = 64.14  $N_1$ = 1.883
$|R_{(1R)}/f|$ = 2.459  $|f/f_1|$ = 0.359  Dp/f = 4.459
$R_{(1R)}$ = 1.566 mm  R(p) = 1.073 mm (second lens element)

Embodiment 3

FIG. 3 shows Embodiment 3 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{12}$–$r_{13}$) of positive refractive power. In order from the object side, the first lens element is of a planar-concave shape, the second lens element is of a double-convex shape, and the third lens element is of a concave-convex shape. Two plane-parallel plates are positioned between the second lens element and the third lens elements. The first plane-parallel plate ($r_8$–$r_9$) is an interference-type filter. The second plane-parallel plate ($r_{10}$–$r_{11}$) is an absorbing-type, infrared cut-off filter. The two plane-parallel plates nearest the image are the cover glass ($r_{14}$–$r_{15}$) of a dust guard and the cover glass ($r_{15}$–$r_{16}$) of an image pick-up element, such as a CCD device. The outer diameter of the positive lens elements of this embodiment is 2 mm

TABLE 3

| # | R | D | $N_d$ | $v_d$ |
|---|---|---|---|---|
| 1 | ∞ | 0.4000 | 1.88300 | 40.76 |
| 2 | 1.5373 | 0.7663 | | |
| 3 | ∞ | 4.8880 | 1.88300 | 40.76 |
| 4 | ∞ | 0.1500 | | |
| 5 | ∞ (stop) | 0.1000 | | |
| 6 | 9.0386 | 1.1776 | 1.88300 | 40.76 |
| 7 | −3.7585 | 0.0500 | | |
| 8 | ∞ | 0.4000 | 1.52287 | 59.89 |
| 9 | ∞ | 0.0300 | | |
| 10 | ∞ | 1.0000 | 1.51400 | 75.00 |
| 11 | ∞ | 0.2000 | | |
| 12 | −14.2710 | 0.4844 | 1.83481 | 42.72 |
| 13 | −4.6110 | 2.6442 | | |
| 14 | ∞ | 0.5000 | 1.51633 | 64.14 |
| 15 | ∞ | 0.5000 | 1.51633 | 64.14 |
| 16 | ∞ | | | | f = 1.252  2ω = 99.8°  $F_{NO}$ = 4.85  IH = 1 mm  OB = 10 mm
$|R_{(3R)}/f|$ = 3.683  υ(p) = 42.72  $N_1$ = 1.883
$|R_{(1R)}/f|$ = 1.228  $|f/f_1|$ = 0.719  Dp/f = 2.805
$R_{(1R)}$ = 1.537 mm

Embodiment 4

Figure 4:
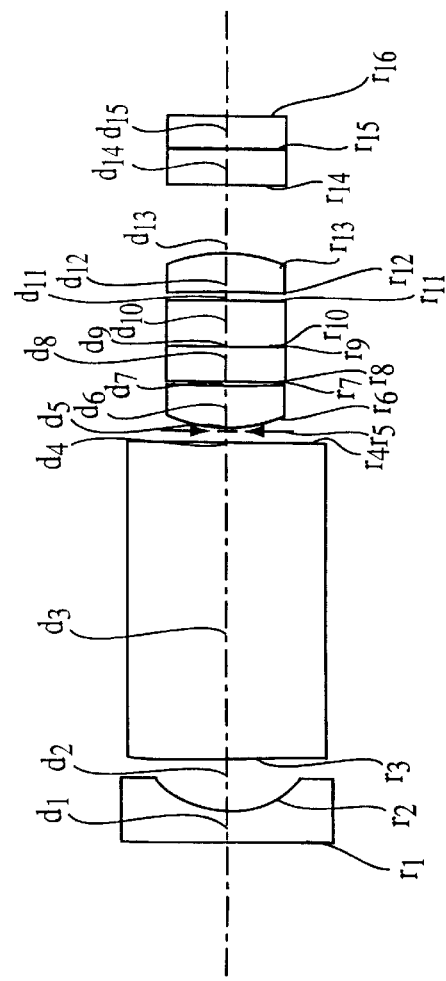
FIG. 4 shows the lens element construction of Embodiment 4.

FIG. 4 shows the objective optical system of Embodiment 4 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{12}$–$r_{13}$) of positive refractive power. In order from the object side, the first lens element is of a planar-concave shape, the second lens element is of a convex-planar shape, and the third lens element is of a concave-convex shape. Two plane-parallel plates ($r_8$–$r_9$, $r_{10}$–$r_{11}$) are positioned between the second lens element and the third lens element. The plane-parallel plate ($r_8$–$r_9$) is an interference-type filter. The plane-parallel plate ($r_{10}$–$r_{11}$) is an absorbing-type, infrared cut-off filter. The two plane-parallel plates nearest the image are the cover glass ($r_{14}$–$r_{15}$) of a dust guard and the cover glass ($r_{15}$–$r_{16}$) of an image pick-up element, such as a CCD device, respectively. The outer diameter of the positive lens elements of this embodiment is 1.4 mm.

TABLE 4

| # | R | D | $N_d$ | $v_d$ |
|---|---|---|---|---|
| 1 | ∞ | 0.3000 | 1.88300 | 40.76 |
| 2 | 1.1258 | 0.7185 | | |
| 3 | ∞ | 4.0390 | 1.88300 | 40.76 |
| 4 | ∞ | 0.2000 | | |
| 5 | ∞ (stop) | 0.0500 | | |
| 6 | 1.8193 | 0.4992 | 1.88300 | 40.76 |
| 7 | ∞ | 0.0491 | | |
| 8 | ∞ | 0.4000 | 1.52287 | 59.89 |
| 9 | ∞ | 0.0300 | | |
| 10 | ∞ | 0.6200 | 1.51400 | 75.00 |
| 11 | ∞ | 0.1000 | | |
| 12 | −10.5214 | 0.4390 | 1.83481 | 42.72 |
| 13 | −2.1984 | 0.8591 | | |

TABLE 4-continued

| # | R | D | $N_d$ | $v_d$ |
|---|---|---|---|---|
| 14 | ∞ | 0.5000 | 1.51633 | 64.14 |
| 15 | ∞ | 0.4000 | 1.51633 | 64.14 |
| 16 | ∞ | | | | f = 0.641   2ω = 100°   $F_{NO}$ = 3.68   IH = 0.5 mm   OB =
$|R_{(3R)}/f|$ = 3.430   $v(p)$ = 42.72   $N_1$ = 1.883   10 mm
$|R_{(1R)}/f|$ = 1.756   $|f/f_1|$ = 0.503   Dp/f = 4.779
$R_{(1R)}$ = 1.126 mm   R(p) = 1.819 mm (second lens element)

Embodiment 5

Figure 5:
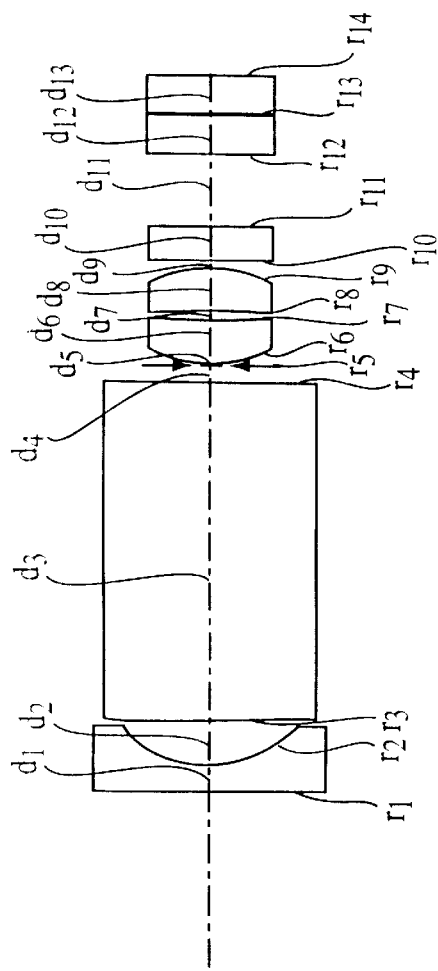
FIG. 5 shows the lens element construction of Embodiment 5.

FIG. 5 shows the objective optical system of Embodiment 5 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_8$–$r_9$) of positive refractive power. In order from the object side, the first lens element is of a planar-concave shape, the second lens element is of a convex-concave shape, and the third lens element is of a concave-convex shape. The two plane-parallel plates ($r_{10}$–$r_{11}$, $r_{13}$–$r_{14}$) are interference-type filters that are arranged at each side of plane-parallel plate ($r_{12}$–$r_{13}$) which is an absorbing type, infrared cut-off filter. The outer diameter of the positive lens elements of this embodiment is 1.4 mm.

TABLE 5

| # | R | D | $N_d$ | $v_d$ |
|---|---|---|---|---|
| 1 | ∞ | 0.3000 | 1.88300 | 40.76 |
| 2 | 1.2534 | 0.5830 | | |
| 3 | ∞ | 4.0390 | 1.88300 | 40.76 |
| 4 | ∞ | 0.2000 | | |
| 5 | ∞ (stop) | 0.0500 | | |
| 6 | 1.9756 | 0.4705 | 1.83481 | 42.72 |
| 7 | 10.1433 | 0.1500 | | |
| 8 | −10.5277 | 0.4863 | 1.88300 | 40.76 |
| 9 | −1.7330 | 0.1000 | | |
| 10 | ∞ | 0.4000 | 1.51400 | 75.00 |
| 11 | ∞ | 0.8362 | | |
| 12 | ∞ | 0.5000 | 1.51633 | 64.14 |
| 13 | ∞ | 0.4000 | 1.51633 | 64.14 |
| 14 | ∞ | | | | f = 0.634   2ω = 100.3°   $F_{NO}$ = 3.29   IH = 0.5 mm   OB =
$|R_{(3R)}/f|$ = 2.733   $v(p)$ = 42.72   $N_1$ = 1.883   10 mm
$|R_{(1R)}/f|$ = 1.977   $|f/f_1|$ = 0.447
$R_{(1R)}$ = 1.253 mm

Embodiment 6

Figure 6:
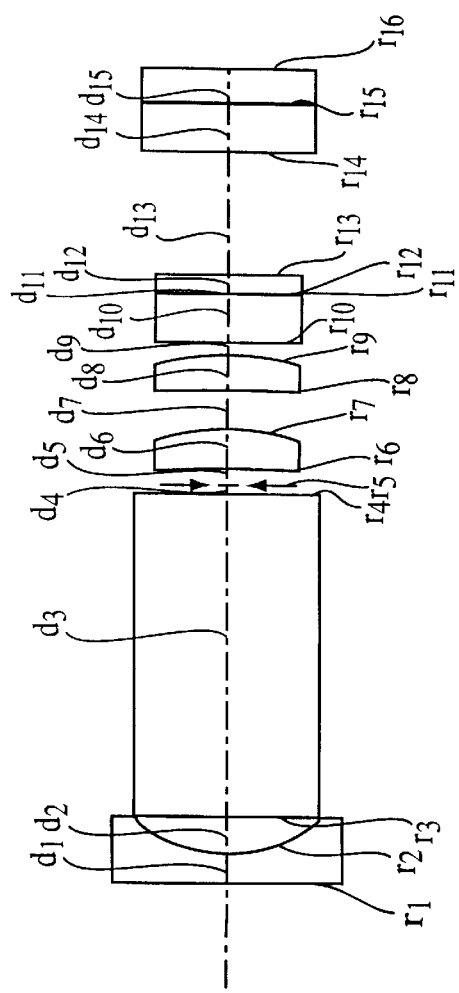
FIG. 6 shows the lens element construction of Embodiment 6.

FIG. 6 shows the objective optical system of Embodiment 6 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_8$–$r_9$) of positive refractive power. In order from the object side, the first lens element is of a planar-concave shape, the second lens element is of a concave-convex shape, and the third lens element is of a planar-convex shape. Two plane-parallel plates ($r_{10}$–$r_{11}$, $r_{12}$–$r_{13}$) are arranged at the image-side of the third lens element. The plane-parallel plate ($r_{10}$–$r_{11}$) is an absorbing-type, infrared cut-off filter. The plane-parallel plate ($r_{12}$–$r_{13}$) is an interference-type filter. The two plane-parallel plates nearest the image are the cover glass ($r_{14}$–$r_{15}$) of a dust guard and the cover glass ($r_{15}$–$r_{16}$) of an image pick-up element, such as a CCD device. The outer diameter of the positive lens elements of this embodiment is 2 mm.

TABLE 6

| # | R | D | $N_d$ | $v_d$ |
|---|---|---|---|---|
| 1 | ∞ | 0.4000 | 1.88300 | 40.76 |
| 2 | 1.7835 | 0.6086 | | |
| 3 | ∞ | 4.6880 | 1.88300 | 40.76 |
| 4 | ∞ | 0.1500 | | |
| 5 | ∞ (stop) | 0.2000 | | |
| 6 | −11.5157 | 0.5519 | 1.88300 | 40.76 |
| 7 | −2.6693 | 0.5912 | | |
| 8 | ∞ | 0.5469 | 1.72916 | 54.68 |
| 9 | −3.5887 | 0.1500 | | |
| 10 | ∞ | 0.6200 | 1.51400 | 75.00 |
| 11 | ∞ | 0.0300 | | |
| 12 | ∞ | 0.4000 | 1.52287 | 59.89 |
| 13 | ∞ | 1.7545 | | |
| 14 | ∞ | 0.7000 | 1.51633 | 64.14 |
| 15 | ∞ | 0.5000 | 1.51633 | 64.14 |
| 16 | ∞ | | | | f = 1.243   2ω = 99.8°   $F_{NO}$ = 4.76   IH = 1 mm   OB =
$|R_{(3R)}/f|$ = 2.887   $v(p)$ = 54.68   $N_1$ = 1.883   10 mm
$|R_{(1R)}/f|$ = 1.435   $|f/f_1|$ = 0.615   Dp/f = 2.613
$R_{(1R)}$ = 1.784 mm   R(p) = 3.589 mm (second lens element)

Embodiment 7

Figure 7:
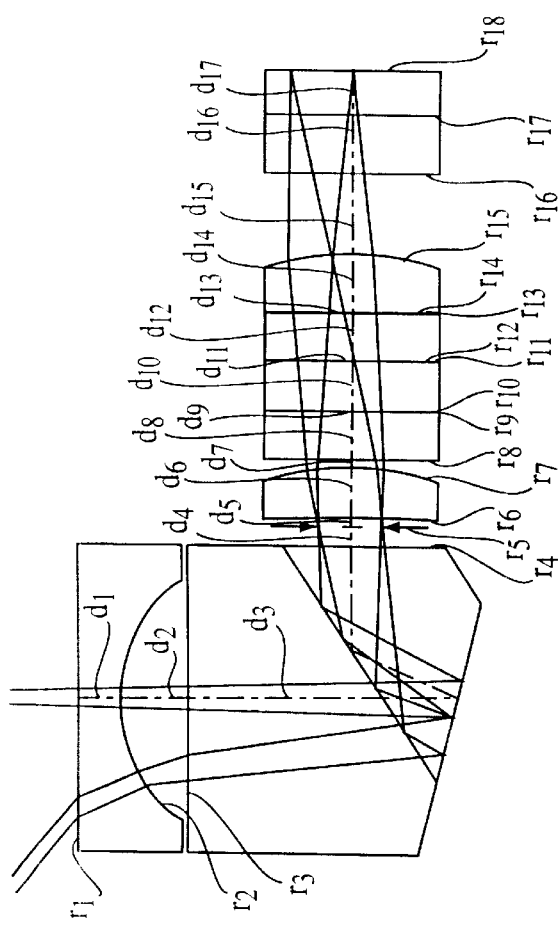
FIG. 7 shows the lens element construction of Embodiment 7.

FIG. 7 shows the retro-focus objective optical system of Embodiment 7 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{14}$–$r_{15}$) of positive refractive power. In order from the object side, the first lens element is of a planar-concave shape, the second lens element is of a planar-convex shape, and the third lens element is of a planar-convex shape. Three plane-parallel plates are positioned between the second lens element and the third lens element. The plane-parallel plate ($r_8$–$r_9$) is an interference-type filter, plane-parallel plate ($r_{10}$–$r_{11}$) is an absorbing-type, infrared cut-off filter, and plane-parallel plate ($r_{12}$–$r_{13}$) is an interference-type filter. The two plane-parallel plates nearest the image are the cover glass ($r_{16}$–$r_{17}$) of a dust guard and the cover glass ($r_{17}$–$r_{18}$) of an image pick-up element, such as a CCD device. The visual field conversion optical element is a twice-reflecting prism, similar to the prism shown in FIG. 40. In this embodiment, each positive lens element includes a side that is planar so as to form an inexpensive objective optical system, and the outer diameter of these positive lens elements is 1.4 mm.

TABLE 7

| # | R | D | $N_d$ | $v_d$ |
|---|---|---|---|---|
| 1 | ∞ | 0.3500 | 1.88300 | 40.76 |
| 2 | 1.2147 | 0.5743 | | |
| 3 | ∞ | 4.0390 | 1.88300 | 40.76 |
| 4 | ∞ | 0.2000 | | |
| 5 | ∞ (stop) | 0.0500 | | |
| 6 | ∞ | 0.4733 | 1.88300 | 40.76 |
| 7 | −1.6382 | 0.0497 | | |
| 8 | ∞ | 0.4000 | 1.52287 | 59.89 |
| 9 | ∞ | 0.0300 | | |
| 10 | ∞ | 0.4000 | 1.51400 | 75.00 |
| 11 | ∞ | 0.0300 | | |
| 12 | ∞ | 0.4000 | 1.52287 | 59.89 |
| 13 | ∞ | 0.0300 | | |
| 14 | ∞ | 0.4714 | 1.51633 | 64.14 |
| 15 | −2.1154 | 0.6767 | | |
| 16 | ∞ | 0.5000 | 1.51633 | 64.14 |
| 17 | ∞ | 0.4000 | 1.51633 | 64.14 |
| 18 | ∞ | | | | f = 0.639   2ω = 99.8°   $F_{NO}$ = 4.04   IH = 0.5 mm   OB =

TABLE 7-continued

| # | R | D | $N_d$ | $\nu_d$ |
|---|---|---|---|---|
| $|R_{(3R)}/f| = 3.310$ | $\nu(p) = 64.14$ | | $N_1 = 1.883$ | 10 mm |
| $|R_{(1R)}/f| = 1.901$ | $|f/f_1| = 0.465$ | | $Dp/f = 4.569$ | |
| $R_{(1R)} = 1.215$ mm | $R(p) = 1.638$ mm (second lens element) | | | |
| | $R(p) = 2.115$ mm (third lens element) | | | |

Embodiment 8

Figure 8:
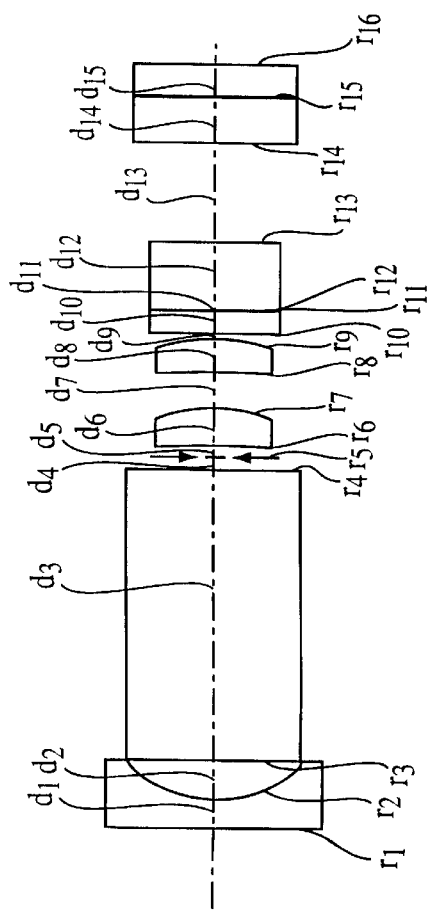
FIG. 8 shows the lens element construction of Embodiment 8.

FIG. 8 illustrates the retro-focus type optical system of Embodiment 8 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_8$–$r_9$) of positive refractive power. In order from the object side, the first lens element is of a planar-concave shape, the second lens element is of a double-convex shape, and the third lens element is of a planar-convex shape. Two plane-parallel plates are positioned at the image-side of the third lens element. The plane-parallel plate ($r_{10}$–$r_{11}$) is an interference-type filter. The plane-parallel plate ($r_{12}$–$r_{13}$) is an absorbing-type, infrared cut-off filter. Further, the two plane-parallel plates nearest the image are a cover glass ($r_{14}$–$r_{15}$) of a dust guard, and a cover glass ($r_{15}$–$r_{16}$) of an image pick-up element. The outer diameter of the positive lens elements of this embodiment is 1.8 mm.

TABLE 8

| # | R | D | $N_d$ | $\nu_d$ |
|---|---|---|---|---|
| 1 | ∞ | 0.4000 | 1.88300 | 40.76 |
| 2 | 1.5848 | 0.7408 | | |
| 3 | ∞ | 4.4880 | 1.88300 | 40.76 |
| 4 | ∞ | 0.1500 | | |
| 5 | ∞ (stop) | 0.1000 | | |
| 6 | 16.6681 | 0.4742 | 1.77250 | 49.60 |
| 7 | −3.2794 | 0.6946 | | |
| 8 | ∞ | 0.4742 | 1.77250 | 49.60 |
| 9 | −4.3947 | 0.1000 | | |
| 10 | ∞ | 0.4000 | 1.52287 | 59.89 |
| 11 | ∞ | 0.0300 | | |
| 12 | ∞ | 1.0000 | 1.49400 | 75.00 |
| 13 | ∞ | 1.5505 | | |
| 14 | ∞ | 0.7000 | 1.51633 | 64.14 |
| 15 | ∞ | 0.5000 | 1.51633 | 64.14 |
| 16 | ∞ | | | |
| f = 1.248 | $2\omega = 99.9°$ | $F_{NO} = 4.04$ | IH = 1 mm | OB = |
| $|R_{(3R)}/f| = 3.521$ | $\nu(p) = 46.62$ | | $N_1 = 1.883$ | 10 mm |
| $|R_{(1R)}/f| = 1.270$ | $|f/f_1| = 0.695$ | | $Dp/f = 2.624$ | |
| $R_{(1R)} = 1.585$ mm | $R(p) = 4.395$ mm (third lens element) | | | |

Embodiment 9

Figure 9:
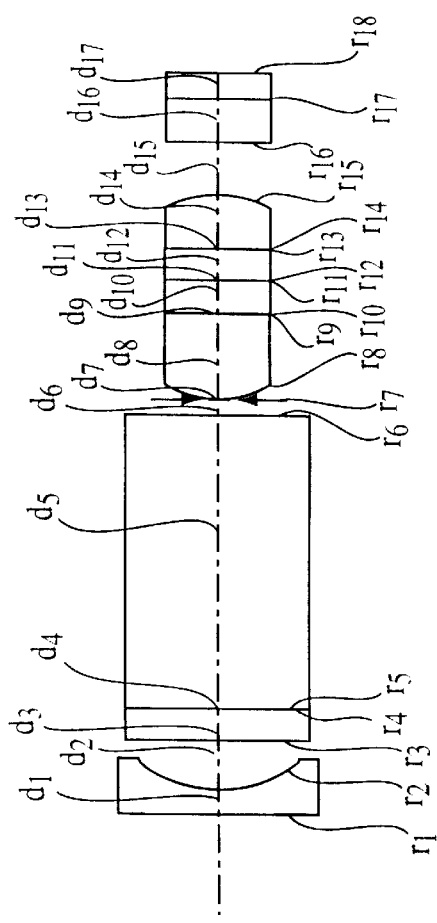
FIG. 9 shows the lens element construction of Embodiment 9.

FIG. 9 shows the retro-focus type objective optical system of Embodiment 9 which includes, in relative order from the object side, a first lens element ($r_1$–$r_2$) of negative refractive power, a visual field conversion optical element ($r_5$–$r_6$), a stop ($r_7$), a second lens element ($r_8$–$r_9$) of positive refractive power, and a third lens element ($r_{14}$–$r_{15}$) of positive refractive power. In order from the object side, the first lens element is of a planar-concave shape, the second lens element is of a convex-planar shape, and the third lens element is of a planar-convex shape. A plane-parallel plate ($r_3$–$r_4$) is positioned between the first lens element and visual field conversion optical element, and two plane-parallel plates are positioned between the second and third lens elements. The plane-parallel plate ($r_3$–$r_4$) is an interference-type filter, the plane-parallel plate ($r_{10}$–$r_{11}$) is an absorbing-type, infrared cut-off filter, and the plane-parallel plate ($r_{12}$–$r_{13}$) is an interference-type filter. Further, the two plane-parallel plates nearest the image are a cover glass ($r_{16}$–$r_{17}$) of a dust guard, and a cover glass ($r_{17}$–$r_{18}$) of an image pick-up element. The outer diameter of the positive lens elements of this embodiment is 1.4 mm.

TABLE 9

| # | R | D | $N_d$ | $\nu_d$ |
|---|---|---|---|---|
| 1 | ∞ | 0.3000 | 1.88300 | 40.76 |
| 2 | 1.3303 | 0.6927 | | |
| 3 | ∞ | 0.4000 | 1.52287 | 59.89 |
| 4 | ∞ | 0.0300 | | |
| 5 | ∞ | 4.0390 | 1.88300 | 40.76 |
| 6 | ∞ | 0.2000 | | |
| 7 | ∞ (stop) | 0.0500 | | |
| 8 | 2.1515 | 1.1537 | 1.88300 | 40.76 |
| 9 | ∞ | 0.0300 | | |
| 10 | ∞ | 0.4000 | 1.52287 | 59.89 |
| 11 | ∞ | 0.0300 | | |
| 12 | ∞ | 0.4000 | 1.51400 | 75.00 |
| 13 | ∞ | 0.0300 | | |
| 14 | ∞ | 0.6911 | 1.88300 | 40.76 |
| 15 | −2.1528 | 0.7187 | | |
| 16 | ∞ | 0.6000 | 1.51633 | 64.14 |
| 17 | ∞ | 0.4000 | 1.51633 | 64.14 |
| 18 | ∞ | | | |
| f = 0.641 | $2\omega = 100°$ | $F_{NO} = 5.18$ | IH = 0.5 mm | OB = 10 mm |
| $|R_{(3R)}/f| = 3.359$ | $\nu(p) = 40.76$ | | $N_1 = 1.883$ | |
| $|R_{(1R)}/f| = 2.075$ | $|f/f_1| = 0.425$ | | $Dp/f = 5.196$ | |
| $R_{(1R)} = 1.330$ mm | $R(p) = 2.152$ mm (second lens element) | | | |
| | $R(p) = 2.153$ mm (third lens element) | | | |

Embodiment 10

Figure 10:
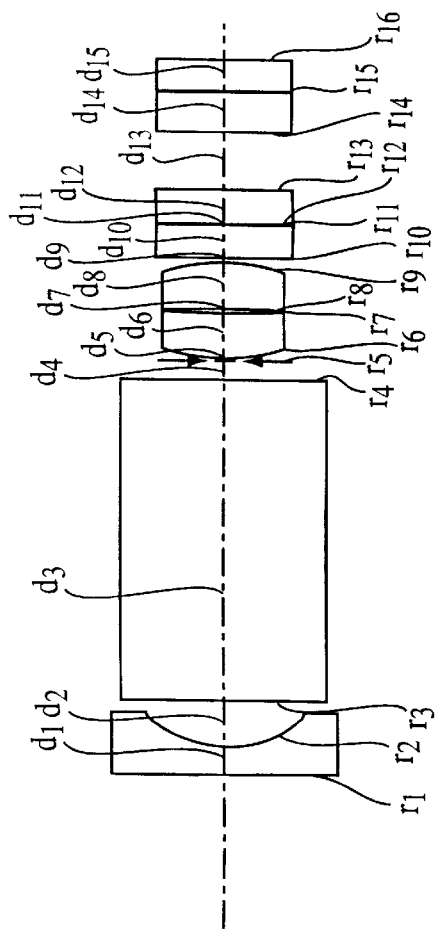
FIG. 10 shows the lens element construction of Embodiment 10.

FIG. 10 shows the retro-focus type objective optical system of Embodiment 10, which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_8$–$r_9$) of positive refractive power. In order from the object side, the first lens element is of a planar-concave shape, the second lens element is of a convex-concave shape, and the third lens element is of a planar-convex shape. Two plane-parallel plates are positioned at the image side of the third lens element. The plane-parallel plate ($r_{10}$–$r_{11}$) is an interference-type filter, and the plane-parallel plate ($r_{13}$–$r_{14}$) is an absorbing-type, infrared cut-off filter. Further, the two plane-parallel plates nearest the image are a cover glass ($r_{14}$–$r_{15}$) of a dust guard, and a cover glass ($r_{15}$–$r_{16}$) of an image pick-up element. The outer diameter of the positive lens elements of this embodiment is 1.4 mm.

TABLE 10

| # | R | D | $N_d$ | $\nu_d$ |
|---|---|---|---|---|
| 1 | ∞ | 0.3000 | 1.88300 | 40.76 |
| 2 | 1.2075 | 0.5716 | | |
| 3 | ∞ | 4.0390 | 1.88300 | 40.76 |
| 4 | ∞ | 0.2000 | | |
| 5 | ∞ (stop) | 0.0500 | | |
| 6 | 2.4057 | 0.4903 | 1.83481 | 42.72 |
| 7 | 9.0763 | 0.1000 | | |
| 8 | ∞ | 0.5800 | 1.88300 | 40.76 |
| 9 | −1.8097 | 0.0500 | | |
| 10 | ∞ | 0.4000 | 1.51400 | 75.00 |
| 11 | ∞ | 0.0300 | | |
| 12 | ∞ | 0.4000 | 1.52287 | 59.89 |
| 13 | ∞ | 0.7190 | | |
| 14 | ∞ | 0.5000 | 1.51633 | 64.14 |
| 15 | ∞ | 0.4000 | 1.51633 | 64.14 |
| 16 | ∞ | | | |
| f = 0.638 | $2\omega = 100°$ | $F_{NO} = 3.39$ | IH = 0.5 mm | OB =10 mm |
| $|R_{(3R)}/f| = 2.837$ | $\nu(p) = 42.72$ | | $N_1 = 1.883$ | |

TABLE 10-continued

| # | R | D | $N_d$ | $v_d$ |
|---|---|---|---|---|
| $|R_{(1R)}/f|$ = 1.893 | $|f/f_1|$ = 0.467 | Dp/f = 4.571 | | |
| $R_{(1R)}$ = 1.208 mm | R(p) = 1.810 mm (third lens element) | | | |

Embodiment 11

Figure 11:
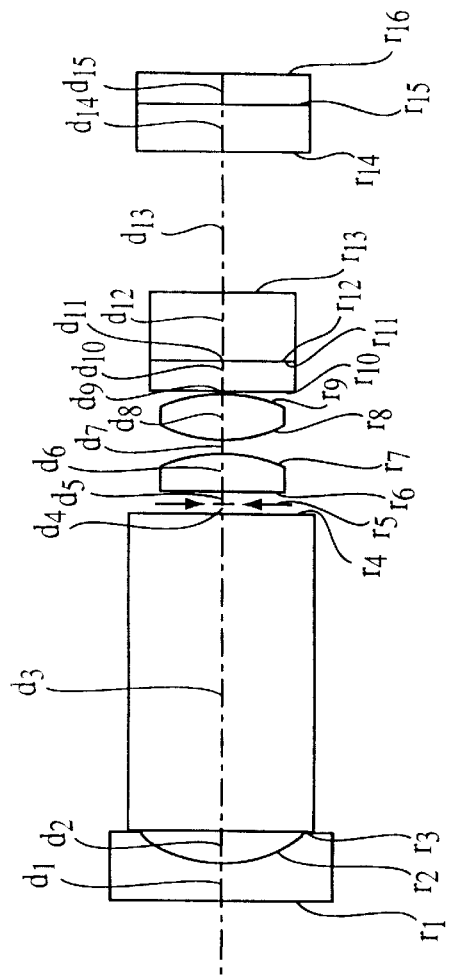
FIG. 11 shows the lens element construction of Embodiment 11.

FIG. 11 shows the retro-focus type objective optical system of Embodiment 11 which includes, in relative order from the object side, a first lens element ($r_1$–$r_2$) of negative refractive power, a visual field conversion optical element (r3–$r_4$), a stop ($r_5$), a second lens element ($r_6$–$r_7$) of positive refractive power, and a third lens element ($r_8$–$r_9$) of positive refractive power. In order from the object side, the first lens element is of a planar-concave shape, the second lens element is of a concave-convex shape, and the third lens element is of a double convex shape. Two plane-parallel plates are positioned at the image side of the third lens element. The plane-parallel plate ($r_{10}$–$r_{11}$) is an interference-type filter. The plane-parallel plate ($r_{12}$–$r_{13}$) is an absorbing-type, infrared cut-off filter. Further, the two plane-parallel plates nearest the image are a cover glass ($r_{14}$–$r_{15}$) of a dust guard, and a cover glass ($r_{15}$–$r_6$) of an image pick-up element. The outer diameter of the positive lens elements of this embodiment is 1.8 mm.

TABLE 11

| # | R | D | $N_d$ | $v_d$ |
|---|---|---|---|---|
| 1 | ∞ | 0.4000 | 1.88300 | 40.76 |
| 2 | 1.3106 | 0.6564 | | |
| 3 | ∞ | 4.6880 | 1.88300 | 40.76 |
| 4 | ∞ | 0.1500 | | |
| 5 | ∞ (stop) | 0.2000 | | |
| 6 | −10.7273 | 0.5473 | 1.51633 | 64.14 |
| 7 | −2.1047 | 0.2680 | | |
| 8 | 3.9808 | 0.5960 | 1.51633 | 64.14 |
| 9 | −4.8617 | 0.1000 | | |
| 10 | ∞ | 0.4000 | 1.52287 | 59.89 |
| 11 | ∞ | 0.0300 | | |
| 12 | ∞ | 1.0000 | 1.49400 | 75.00 |
| 13 | ∞ | 2.0324 | | |
| 14 | ∞ | 0.7000 | 1.51633 | 64.14 |
| 15 | ∞ | 0.5000 | 1.51633 | 64.14 |
| 16 | ∞ | | | |
| f = 1.113 | 2ω = 119.8° | $F_{NO}$ = 5.25 | IH = 1 mm | OB = 10 mm |
| $|R_{(3R)}/f|$ = 4.368 | v(p) = 64.14 | $N_1$ = 1.883 | | |
| $|R_{(1R)}/f|$ = 1.178 | $|f/f_1|$ = 0.750 | Dp/f = 2.961 | | |
| $R_{(1R)}$ = 1.311 mm | | | | |

Embodiment 12

Figure 12:
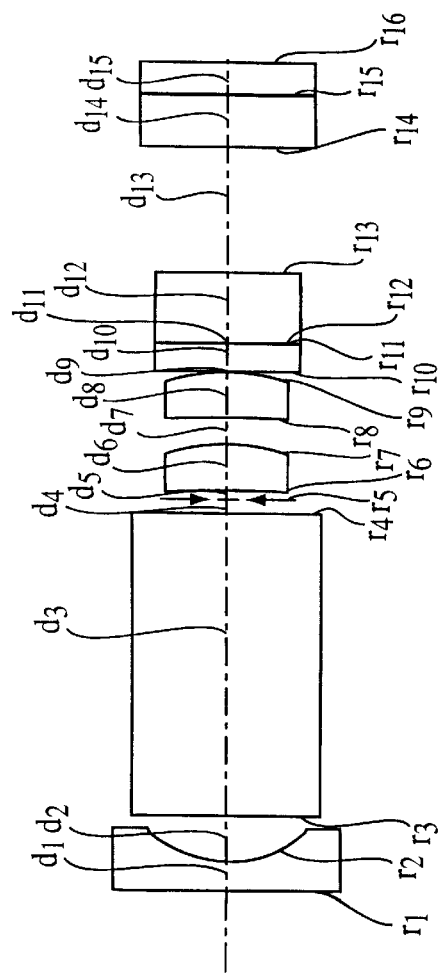
FIG. 12 shows the lens element construction of Embodiment 12.

FIG. 12 shows the retro-focus type objective optical system of Embodiment 12 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_8$–$r_9$) of positive refractive power. In order from the object side, the first lens element is of a planar-concave shape, the second lens element is of a planar-convex shape, and the third lens element is of a double-convex shape. Two plane-parallel plates are positioned at the image side of the third lens element. The plane-parallel plate ($r_{10}$–$r_{11}$) is an interference-type filter. The plane-parallel plate ($r_{12}$–$r_{13}$) is an absorbing-type, infrared cut-off filter. Further, the two plane-parallel plates nearest the image are a cover glass ($r_{14}$–$r_{15}$) of a dust guard, and a cover glass ($r_{15}$–$r_{16}$) of an image pick-up element. The outer diameter of the positive lens elements of this embodiment is 1.8 mm.

TABLE 12

| # | R | D | $N_d$ | $v_d$ |
|---|---|---|---|---|
| 1 | ∞ | 0.4000 | 1.88300 | 40.76 |
| 2 | 1.5501 | 0.6505 | | |
| 3 | ∞ | 4.4880 | 1.88300 | 40.76 |
| 4 | ∞ | 0.1500 | | |
| 5 | ∞ (stop) | 0.1000 | | |
| 6 | ∞ | 0.6311 | 1.51633 | 64.14 |
| 7 | −1.9922 | 0.5026 | | |
| 8 | 14.5808 | 0.5623 | 1.51633 | 64.14 |
| 9 | −3.2050 | 0.1000 | | |
| 10 | ∞ | 0.4000 | 1.52287 | 59.89 |
| 11 | ∞ | 0.0300 | | |
| 12 | ∞ | 1.0000 | 1.49400 | 75.00 |
| 13 | ∞ | 1.7914 | | |
| 14 | ∞ | 0.7000 | 1.51633 | 64.14 |
| 15 | ∞ | 0.5000 | 1.51633 | 64.14 |
| 16 | ∞ | | | |
| f = 1.246 | 2ω = 99.9° | $F_{NO}$ = 5.15 | IH = 1 mm | OB = 10 mm |
| $|R_{(3R)}/f|$ = 2.572 | v(p) = 64.14 | $N_1$ = 1.883 | | |
| $|R_{(1R)}/f|$ = 1.244 | $|f/f_1|$ = 0.710 | Dp/f = 2.555 | | |
| $R_{(1R)}$ = 1.550 mm | R(p) = 1.992 mm (second lens element) | | | |

Embodiment 13

Figure 13:
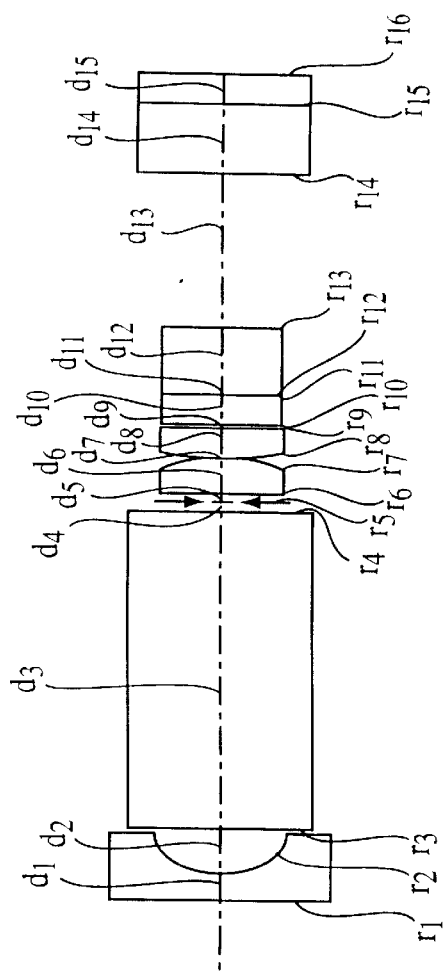
FIG. 13 shows the lens element construction of Embodiment 13.

FIG. 13 shows the retro-focus type objective optical system of Embodiment 13, which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_8$–$r_9$) of positive refractive power. In order from the object side, the first lens element is of a planar-concave shape, the second lens element is of a double-convex shape, and the third lens element is of a double-convex shape. Two plane-parallel plates are positioned at the image side of the third lens element. Plane-parallel plate ($r_{10}$–$r_{11}$) is an interference-type filter, and plane-parallel plate ($r_{12}$–$r_{13}$) is an absorbing-type, infrared cut-off filter. Further, the two plane-parallel plates nearest the image are a cover glass ($r_{14}$–$r_{15}$) of a dust guard, and a cover glass ($r_{15}$–$r_{16}$) of an image pick-up element. The outer diameter of the positive lens elements of this embodiment is 1.8 mm.

TABLE 13

| # | R | D | $N_d$ | $v_d$ |
|---|---|---|---|---|
| 1 | ∞ | 0.4000 | 1.88300 | 40.76 |
| 2 | 1.2388 | 0.6010 | | |
| 3 | ∞ | 4.8880 | 1.88300 | 40.76 |
| 4 | ∞ | 0.1500 | | |
| 5 | ∞ (stop) | 0.1000 | | |
| 6 | 13.7617 | 0.5107 | 1.88300 | 40.76 |
| 7 | −4.2664 | 0.0500 | | |
| 8 | 9.0191 | 0.4747 | 1.83481 | 42.72 |
| 9 | −13.1527 | 0.1000 | | |
| 10 | ∞ | 0.4000 | 1.52287 | 59.89 |
| 11 | ∞ | 0.0300 | | |
| 12 | ∞ | 1.0000 | 1.49400 | 75.00 |
| 13 | ∞ | 2.3207 | | |
| 14 | ∞ | 1.0000 | 1.51633 | 64.14 |
| 15 | ∞ | 0.5000 | 1.51633 | 64.14 |
| 16 | ∞ | | | |
| f = 1.249 | 2ω = 100.2° | $F_{NO}$ = 4.0 | IH = 1 mm | OB = 10 mm |
| $|R_{(3R)}/f|$ = 10.531 | v(p) = 42.72 | $N_1$ = 1.883 | | |
| $|R_{(1R)}/f|$ = 0.992 | $|f/f_1|$ = 0.890 | Dp/f = 2.680 | | |
| $R_{(1R)}$ = 1.239 mm | | | | |

Embodiment 14

Figure 14:
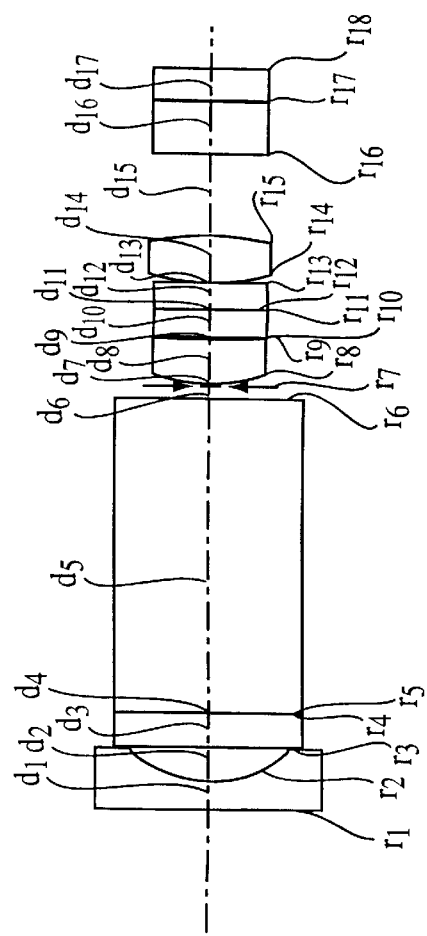
FIG. 14 shows the lens element construction of Embodiment 14.

FIG. 14 shows the retro-focus type objective optical system of Embodiment 14, which includes, in relative order from the object side, a first lens element ($r_1$–$r_2$) of negative refractive power, a visual field conversion optical element ($r_5$–$r_6$), a stop ($r_7$), a second lens element ($r_8$–$r_9$) of positive refractive power, and a third lens element ($r_{14}$–$r_{15}$) of positive refractive power. In order from the object side, the first lens element is of a planar-concave shape, the second lens element is of a convex-planar shape, and the third lens element is of a double-convex shape. A plane-parallel plate ($r_3$–$r_4$) is positioned between the first lens element and the visual field conversion optical element, and two plane parallel plates are positioned between the second lens element and the third lens element. The plane-parallel plate ($r_3$–$r_4$) is an interference-type filter, the plane-parallel plate ($r_{10}$–$r_{11}$) is an absorbing-type, infrared cut-off filter, and the plane-parallel plate ($r_{12}$–$r_{13}$) is an interference-type filter. Further, the two plane-parallel plates nearest the image are a cover glass ($r_{16}$–$r_{17}$) of a dust guard, and a cover glass ($r_{17}$–$r_{18}$) of an image pick-up element. The outer diameter of the positive lens elements of this embodiment is 1.4 mm.

TABLE 14

| # | R | D | $N_d$ | $v_d$ |
|---|---|---|---|---|
| 1 | ∞ | 0.3000 | 1.88300 | 40.76 |
| 2 | 1.1154 | 0.5044 | | |
| 3 | ∞ | 0.4000 | 1.52287 | 59.89 |
| 4 | ∞ | 0.0300 | | |
| 5 | ∞ | 4.0390 | 1.88300 | 40.76 |
| 6 | ∞ | 0.2000 | | |
| 7 | ∞ (stop) | 0.0500 | | |
| 8 | 2.5074 | 0.4719 | 1.88300 | 40.76 |
| 9 | ∞ | 0.0300 | | |
| 10 | ∞ | 0.4000 | 1.52287 | 59.89 |
| 11 | ∞ | 0.0300 | | |
| 12 | ∞ | 0.4000 | 1.51400 | 75.00 |
| 13 | ∞ | 0.0300 | | |
| 14 | 3.6479 | 0.4770 | 1.88300 | 40.76 |
| 15 | –6.9940 | 1.1741 | | |
| 16 | ∞ | 0.6000 | 1.51633 | 64.14 |
| 17 | ∞ | 0.4000 | 1.51633 | 64.14 |
| 18 | ∞ | | | | f = 0.638   2ω = 100.3°   $F_{NO}$ = 3.23   IH = 0.5 mm   OB = 10 mm
|$R_{(3R)}$/f| = 10.962   υ(p) = 40.76   $N_1$ = 1.883
|$R_{(1R)}$/f| = 1.748   |f/$f_1$| = 0.505   Dp/f = 4.925
$R_{(1R)}$ = 1.115 mm   R(p) = 2.507 mm (second lens element)

Embodiment 15

Figure 15:
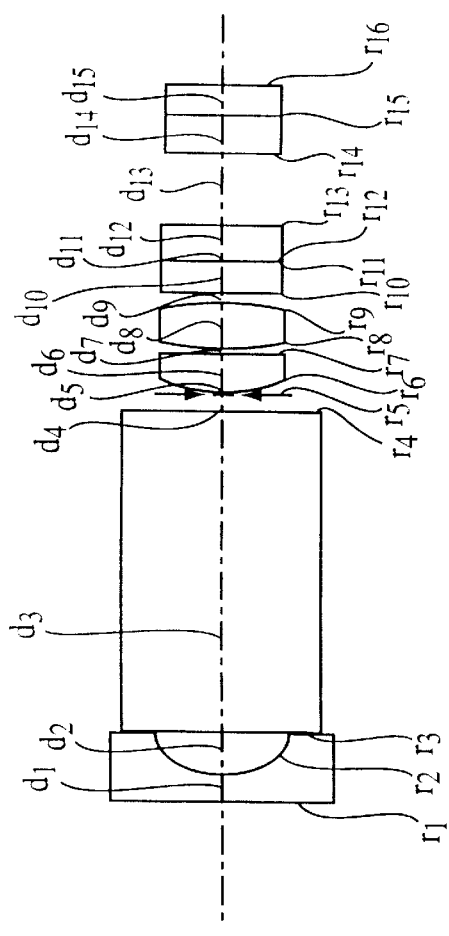
FIG. 15 shows the lens element construction of Embodiment 15.

FIG. 15 shows the retro-focus type objective optical system of Embodiment 15, which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_8$–$r_9$) of positive refractive power. In order from the object side, the first lens element is of a planar-concave shape, the second lens element is of a convex-concave shape, and the third lens element is of a double-convex shape. Two plane-parallel plates ($r_{10}$–$r_{11}$, $r_{12}$–$r_{13}$) are positioned on the image side of the third lens element. The plane-parallel plate ($r_{10}$–$r_{11}$) is an interference-type filter, and the plane-parallel plate ($r_{12}$–$r_{13}$) is an absorbing-type, infrared cut-off filter. Further, the two plane-parallel plates nearest the image are a cover glass ($r_{14}$–$r_{15}$) of a dust guard, and a cover glass ($r_{15}$–$r_{16}$) of an image pick-up element. The outer diameter of the positive lens elements of this embodiment is 1.4 mm.

TABLE 15

| # | R | D | $N_d$ | $v_d$ |
|---|---|---|---|---|
| 1 | ∞ | 0.3000 | 1.88300 | 40.76 |
| 2 | 1.0348 | 0.6120 | | |

TABLE 15-continued

| # | R | D | $N_d$ | $v_d$ |
|---|---|---|---|---|
| 3 | ∞ | 4.0390 | 1.88300 | 40.76 |
| 4 | ∞ | 0.2000 | | |
| 5 | ∞ (stop) | 0.0500 | | |
| 6 | 3.3166 | 0.4451 | 1.90135 | 31.55 |
| 7 | 7.6870 | 0.1000 | | |
| 8 | 3.4558 | 0.5628 | 1.81600 | 46.62 |
| 9 | –2.7646 | 0.0968 | | |
| 10 | ∞ | 0.4000 | 1.51400 | 75.00 |
| 11 | ∞ | 0.0300 | | |
| 12 | ∞ | 0.4000 | 1.52287 | 59.89 |
| 13 | ∞ | 0.9328 | | |
| 14 | ∞ | 0.5000 | 1.51633 | 64.14 |
| 15 | ∞ | 0.4000 | 1.51633 | 64.14 |
| 16 | ∞ | | | | f = 0.646   2ω = 100°   $F_{NO}$ = 2.9   IH = 0.5 mm   OB = 10 mm
|$R_{(3R)}$/f| = 4.280   υ(p) = 46.62   $N_1$ = 1.883
|$R_{(1R)}$/f| = 1.602   |f/$f_1$| = 0.551   Dp/f = 4.577
$R_{(1R)}$ = 1.035 mm

Embodiment 16

Figure 16:
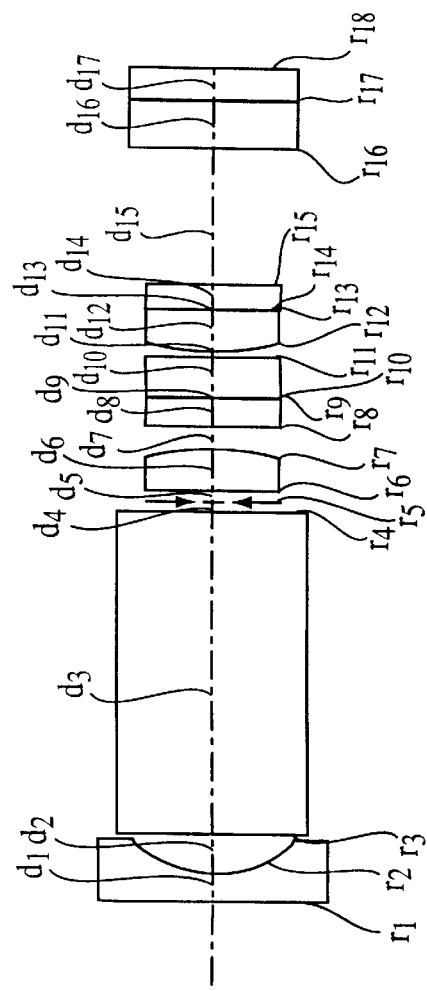
FIG. 16 shows the lens element construction of Embodiment 16.

FIG. 16 shows the retro-focus type objective optical system of Embodiment 16, which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{12}$–$r_{13}$) of positive refractive power. In order from the object side, the first lens element is of a planar-concave shape, the second lens element is of a concave-convex shape, and the third lens element is of a convex-planar shape. The plane-parallel plate ($r_8$–$r_9$) adjacent the second lens element is an interference-type filter, the next plane-parallel plate ($r_{10}$–$r_{11}$) is an absorbing-type, infrared cut-off filter, and the next plane-parallel plate ($r_{14}$–$r_{15}$) is an interference-type filter. Further, the two plane-parallel plates nearest the image are a cover glass ($r_{16}$–$r_{17}$) of a dust guard, and a cover glass ($r_{17}$–$r_{18}$) of an image pick-up element. The outer diameter of the positive lens elements of this embodiment is 1.2 mm.

TABLE 16

| # | R | D | $N_d$ | $v_d$ |
|---|---|---|---|---|
| 1 | ∞ | 0.4000 | 1.88300 | 40.76 |
| 2 | 1.6597 | 0.7110 | | |
| 3 | ∞ | 4.6880 | 1.88300 | 40.76 |
| 4 | ∞ | 0.1500 | | |
| 5 | ∞ (stop) | 0.2000 | | |
| 6 | –13.1964 | 0.5930 | 1.88300 | 40.76 |
| 7 | –2.3885 | 0.3400 | | |
| 8 | ∞ | 0.4000 | 1.52287 | 59.89 |
| 9 | ∞ | 0.0300 | | |
| 10 | ∞ | 0.6200 | 1.51400 | 75.00 |
| 11 | ∞ | 0.1000 | | |
| 12 | 5.4290 | 0.5015 | 1.77250 | 49.60 |
| 13 | ∞ | 0.0300 | | |
| 14 | ∞ | 0.4000 | 1.52287 | 59.89 |
| 15 | ∞ | 2.0082 | | |
| 16 | ∞ | 0.7000 | 1.51633 | 64.14 |
| 17 | ∞ | 0.5000 | 1.51633 | 64.14 |
| 18 | ∞ | | | | f = 1.248   2ω = 100.1°   $F_{NO}$ = 5.1   IH = 1 mm   OB = 10 mm
υ(p) = 49.60   $N_1$ = 1.883
|$R_{(1R)}$/f| = 1.330   |f/$f_1$| = 0.664   Dp/f = 2.685
$R_{(1R)}$ = 1.660 mm

Embodiment 17

Figure 17:
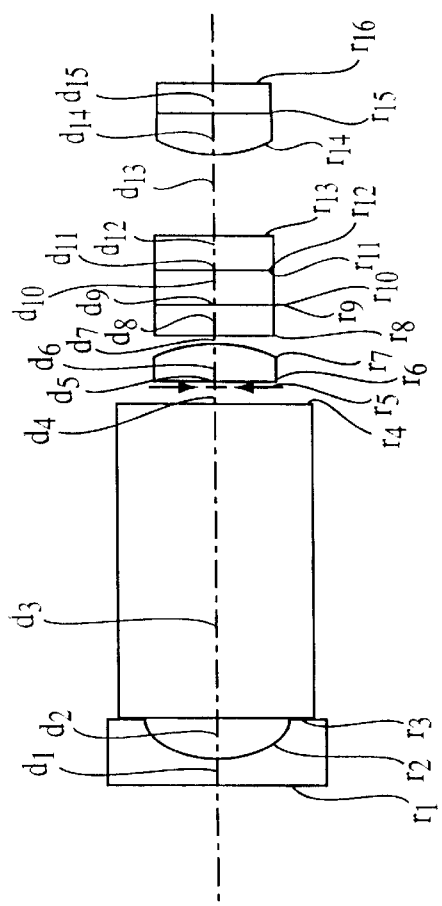
FIG. 17 shows the lens element construction of Embodiment 17.

FIG. 17 shows the retro-focus type objective optical system of Embodiment 17 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{14}$–$r_{15}$) of positive refractive power. In order from the object side, the first lens element is of a planar-concave shape, the second lens element is of a planar-convex shape, and the third lens element is of a convex-planar shape. The plane-parallel plate ($r_8$–$r_9$) adjacent the second lens element is an interference-type filter, the next plane-parallel plate ($r_{10}$–$r_{11}$) is an absorbing-type, infrared cut-off filter, and the next plane-parallel plate ($r_{12}$–$r_{13}$) is an interference-type filter. Further, the third lens element is connected to the cover glass ($r_{15}$–$r_{16}$) of an image pick-up element, such as a CCD. The outer diameter of the positive lens elements of this embodiment is 1.2 mm.

TABLE 17

| # | R | D | $N_d$ | $v_d$ |
|---|---|---|---|---|
| 1 | ∞ | 0.3500 | 1.88300 | 40.76 |
| 2 | 1.2100 | 0.5829 | | |
| 3 | ∞ | 4.0390 | 1.88300 | 40.76 |
| 4 | ∞ | 0.2000 | | |
| 5 | ∞ (stop) | 0.0500 | | |
| 6 | ∞ | 0.5267 | 1.88300 | 40.76 |
| 7 | −1.5173 | 0.0626 | | |
| 8 | ∞ | 0.4000 | 1.52287 | 59.89 |
| 9 | ∞ | 0.0300 | | |
| 10 | ∞ | 0.4000 | 1.51400 | 75.00 |
| 11 | ∞ | 0.0300 | | |
| 12 | ∞ | 0.4000 | 1.52287 | 59.89 |
| 13 | ∞ | 1.0059 | | |
| 14 | 1.5190 | 0.5443 | 1.51633 | 64.14 |
| 15 | ∞ | 0.4000 | 1.51633 | 64.14 |
| 16 | ∞ | | | | f = 0.634   2ω = 99.8°   $F_{NO}$ = 4.0   IH = 0.5 mm   OB = 10 mm
v(p) = 64.14   $N_1$ = 1.883
$|R_{(1R)}/f|$ = 1.909   $|f/f_1|$ = 0.463   Dp/f = 4.618
$R_{(1R)}$ = 1.210 mm   R(p) = 1.517 mm (second lens element)
R(p) = 1.519 mm (third lens element)

Embodiment 18

Figure 18:
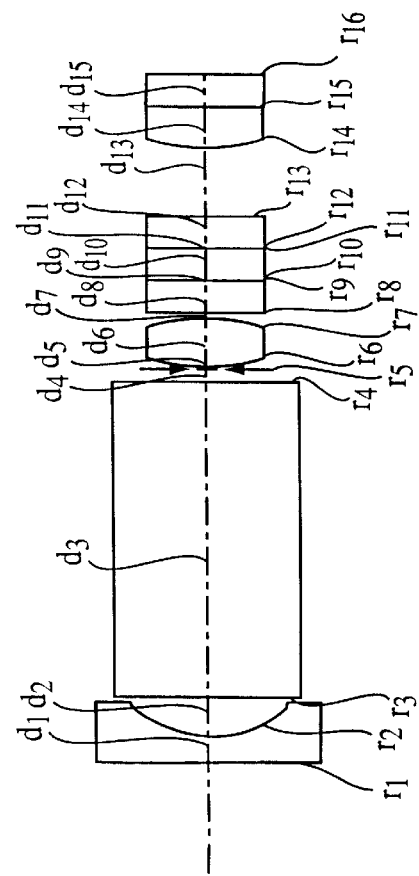
FIG. 18 shows the lens element construction of Embodiment 18.

FIG. 18 shows the retro-focus type objective optical system of Embodiment 18 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{14}$–$r_{15}$) of positive refractive power. In order from the object side, the first lens element is of a planar-concave shape, the second lens element is of a double-convex shape, and the third lens element is of a convex-planar shape. The plane-parallel plate ($r_8$–$r_9$) adjacent the second lens element is an interference-type filter, the next plane-parallel plate ($r_{10}$–$r_{11}$) is an absorbing-type, infrared cut-off filter, and the next plane-parallel plate ($r_{12}$–$r_{13}$) is an interference-type filter. Further, the third lens element is joined to the cover glass ($r_{15}$–$r_{16}$) of an image pick-up element, such as a CCD. The outer diameter of the positive lens elements of this embodiment is 1.4 mm.

TABLE 18

| # | R | D | $N_d$ | $v_d$ |
|---|---|---|---|---|
| 1 | ∞ | 0.3000 | 1.88300 | 40.76 |
| 2 | 0.9656 | 0.5198 | | |
| 3 | ∞ | 4.0390 | 1.88300 | 40.76 |
| 4 | ∞ | 0.2000 | | |
| 5 | ∞ (stop) | 0.0500 | | |
| 6 | 2.3698 | 0.5850 | 1.88300 | 40.76 |
| 7 | −3.3261 | 0.0736 | | |
| 8 | ∞ | 0.4000 | 1.52287 | 59.89 |
| 9 | ∞ | 0.0300 | | |
| 10 | ∞ | 0.4000 | 1.51400 | 75.00 |
| 11 | ∞ | 0.0300 | | |
| 12 | ∞ | 0.4000 | 1.52287 | 59.89 |
| 13 | ∞ | 0.8997 | | |
| 14 | 1.9322 | 0.5354 | 1.77250 | 49.60 |
| 15 | ∞ | 0.4000 | 1.51633 | 64.14 |
| 16 | ∞ | | | | f = 0.56   2ω = 120.4°   $F_{NO}$ = 3.64   IH = 0.5 mm   OB = 10 mm
v(p) = 49.60   $N_1$ = 1.883
$|R_{(1R)}/f|$ = 1.724   $|f/f_1|$ = 0.512   Dp/f = 5.116
$R_{(1R)}$ = 0.966 mm   R(p) = 1.932 mm (third lens element)

Embodiment 19

Figure 19:
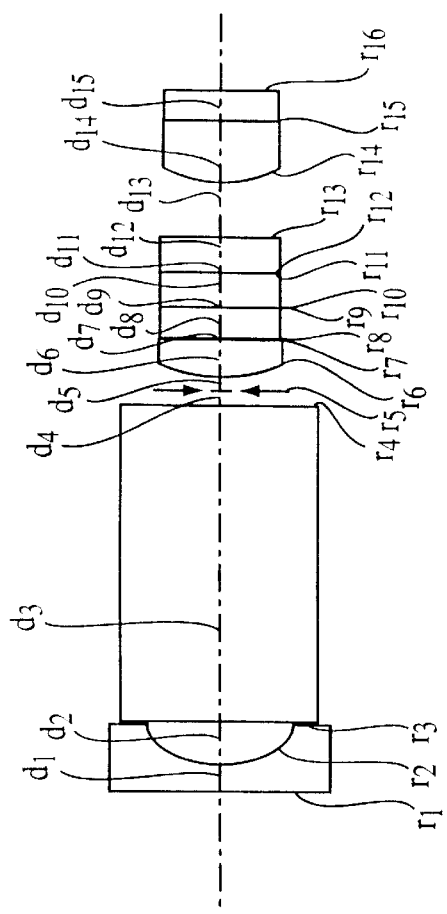
FIG. 19 shows the lens element construction of Embodiment 19.

FIG. 19 shows the retro-focus type objective optical system of Embodiment 19 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{14}$–$r_{15}$) of positive refractive power. In order from the object side, the first lens element is of a planar-concave shape, and both the second lens element and the third lens element are of a convex-planar shape. The plane-parallel plate ($r_8$–$r_9$) adjacent the second lens element is an interference-type filter, the next plane-parallel plate ($r_{10}$–$r_{11}$) is an absorbing-type, infrared cut-off filter, and the next plane-parallel plate ($r_{12}$–$r_{13}$) is an interference-type filter. Further, the third lens element is joined to the cover glass ($r_{15}$–$r_{16}$) of an image pick-up element, such as a CCD. The outer diameter of the positive lens elements of this embodiment is 1.4 mm.

TABLE 19

| # | R | D | $N_d$ | $v_d$ |
|---|---|---|---|---|
| 1 | ∞ | 0.3000 | 1.88300 | 40.76 |
| 2 | 1.2315 | 0.5909 | | |
| 3 | ∞ | 4.0390 | 1.88300 | 40.76 |
| 4 | ∞ | 0.2000 | | |
| 5 | ∞ (stop) | 0.0500 | | |
| 6 | 1.6105 | 0.5617 | 1.88300 | 40.76 |
| 7 | ∞ | 0.0500 | | |
| 8 | ∞ | 0.4000 | 1.52287 | 59.89 |
| 9 | ∞ | 0.0300 | | |
| 10 | ∞ | 0.4000 | 1.51400 | 75.00 |
| 11 | ∞ | 0.0300 | | |
| 12 | ∞ | 0.4000 | 1.52287 | 59.89 |
| 13 | ∞ | 0.6810 | | |
| 14 | 1.1837 | 0.8094 | 1.51633 | 64.14 |
| 15 | ∞ | 0.4000 | 1.51633 | 64.14 |
| 16 | ∞ | | | | f = 0.645   2ω = 100.4°   $F_{NO}$ = 4.03   IH = 0.5 mm   OB = 10 mm
v(p) = 64.14   $N_1$ = 1.883
$|R_{(1R)}/f|$ = 1.909   $|f/f_1|$ = 0.462   Dp/f = 4.552
$R_{(1R)}$ = 1.232 mm   R(p) = 1.611 mm (second lens element)
R(p) = 1.184 mm (third lens element)

Embodiment 20

Figure 20:
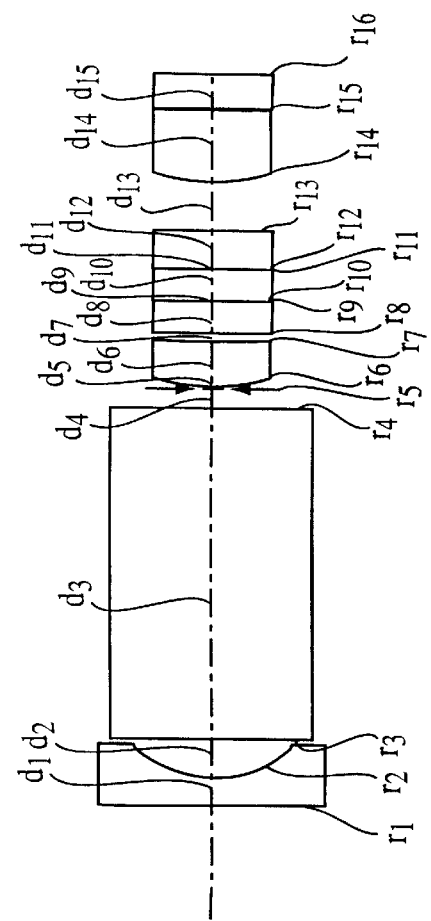
FIG. 20 shows the lens element construction of Embodiment 20.

FIG. 20 shows the retro-focus type objective optical system of Embodiment 20 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{14}$–$r_{15}$) of positive refractive power. In order from the object side, the first lens element is of a planar-concave shape, the second lens element is of a convex-concave shape, and the third lens element is of a convex-planar shape. The plane-parallel plate ($r_8$–$r_9$) adjacent the second lens element is an interference-type filter, the next plane-parallel plate ($r_{10}$–$r_{11}$) is an absorbing-type, infrared cut-off filter, and the next plane-parallel plate ($r_{12}$–$r_{13}$) is an interference-type filter. Further, the third lens element is joined to the cover glass ($r_{15}$–$r_{16}$) of an image pick-up element, such as a CCD. The outer diameter of the positive lens elements of this embodiment is 1.4 mm.

TABLE 20

| # | R | D | $N_d$ | $\upsilon_d$ |
|---|---|---|---|---|
| 1 | ∞ | 0.3000 | 1.88300 | 40.76 |
| 2 | 1.2344 | 0.5872 | | |
| 3 | ∞ | 4.0390 | 1.88300 | 40.76 |
| 4 | ∞ | 0.2000 | | |
| 5 | ∞ (stop) | 0.0500 | | |
| 6 | 1.3963 | 0.5499 | 1.88300 | 40.76 |
| 7 | 7.6320 | 0.1000 | | |
| 8 | ∞ | 0.4000 | 1.52287 | 59.89 |
| 9 | ∞ | 0.0300 | | |
| 10 | ∞ | 0.4000 | 1.51400 | 75.00 |
| 11 | ∞ | 0.0300 | | |
| 12 | ∞ | 0.4000 | 1.52287 | 59.89 |
| 13 | ∞ | 0.5706 | | |
| 14 | 1.1560 | 0.8894 | 1.51633 | 64.14 |
| 15 | ∞ | 0.4000 | 1.51633 | 64.14 |
| 16 | ∞ | | | | f = 0.650　　2ω = 100.4°　$F_{NO}$ = 4.05　IH = 0.5 mm　OB =
　　　　　　　　$\upsilon(p)$ = 64.14　　$N_1$ = 1.883　10 mm
$|R_{(1R)}/f|$ = 1.899　　$|f/f_1|$ = 0.465　　Dp/f = 4.511
$R_{(1R)}$ = 1.234 mm　　R(p) = 1.156 mm (third lens element)

Embodiment 21

Figure 21:
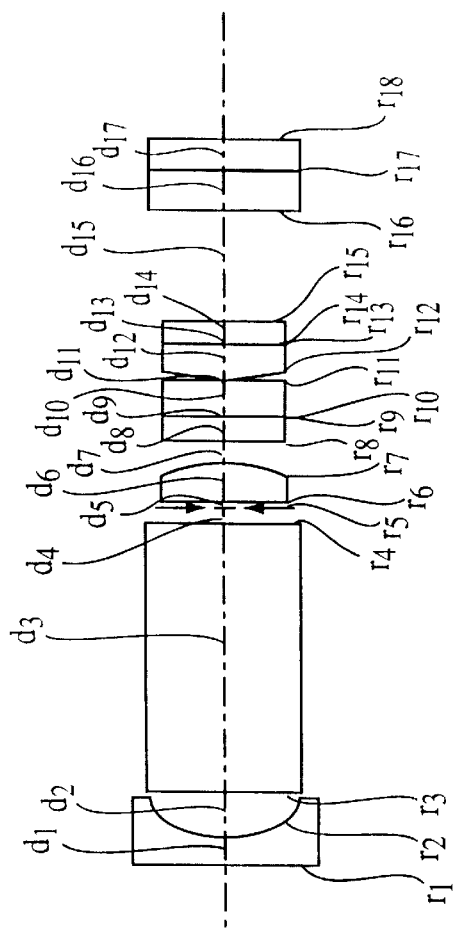
FIG. 21 shows the lens element construction of Embodiment 21.

FIG. 21 shows the retro-focus type objective optical system of Embodiment 21 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{12}$–$r_{13}$) of positive refractive power. In order from the object side, the first lens element is of a planar-concave shape, the second lens element is of a concave-convex shape, and the third lens element is of a convex-concave shape. The plane-parallel plate ($r_8$–$r_9$) on the image-side of the second lens element is an interference-type filter, the next plane-parallel plate ($r_{10}$–$r_{11}$) is an absorbing-type, infrared cut-off filter, and the next plane-parallel plate ($r_{14}$–$r_{15}$) is an interference-type filter. Further, the two plane-parallel plates nearest the image are a cover glass ($r_{16}$–$r_{17}$) of a dust guard, and a cover glass ($r_{17}$–$r_{18}$) of an image pick-up element. The outer diameter of the positive lens elements of this embodiment is 2 mm

TABLE 21

| # | R | D | $N_d$ | $\upsilon_d$ |
|---|---|---|---|---|
| 1 | ∞ | 0.4000 | 1.88300 | 40.76 |
| 2 | 1.6531 | 0.7157 | | |
| 3 | ∞ | 4.6880 | 1.88300 | 40.76 |
| 4 | ∞ | 0.1500 | | |
| 5 | ∞ (stop) | 0.2000 | | |
| 6 | −13.2955 | 0.6361 | 1.88300 | 40.76 |
| 7 | −2.3467 | 0.3879 | | |
| 8 | ∞ | 0.4000 | 1.52287 | 59.89 |
| 9 | ∞ | 0.0300 | | |
| 10 | ∞ | 0.6200 | 1.51400 | 75.00 |
| 11 | ∞ | 0.0500 | | |
| 12 | 4.7058 | 0.4811 | 1.88300 | 40.76 |
| 13 | 14.2899 | 0.1000 | | |
| 14 | ∞ | 0.4000 | 1.52287 | 59.89 |
| 15 | ∞ | 1.9094 | | |
| 16 | ∞ | 0.7000 | 1.51633 | 64.14 |

TABLE 21-continued

| # | R | D | $N_d$ | $\upsilon_d$ |
|---|---|---|---|---|
| 17 | ∞ | 0.5000 | 1.51633 | 64.14 |
| 18 | ∞ | | | | f = 1.247　　2ω = 100.2°　$F_{NO}$ = 5.12　IH = 1 mm　OB =
$|R_{(3R)}/f|$ = 11.459　　$\upsilon(p)$ = 40.76　　$N_1$ = 1.883　10 mm
$|R_{(1R)}/f|$ = 1.326　　$|f/f_1|$ = 0.666　　Dp/f = 2.691
$R_{(1R)}$ = 1.653 mm Embodiment 22

Figure 22:
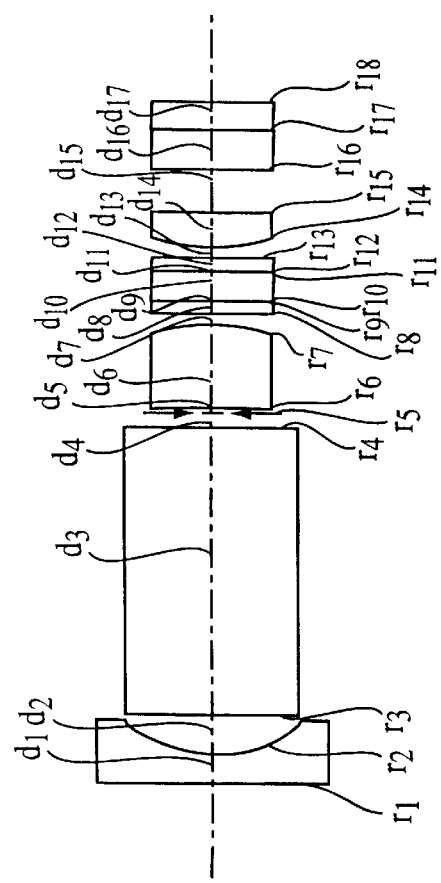
FIG. 22 shows the lens element construction of Embodiment 22.

FIG. 22 shows the retro-focus type objective optical system of Embodiment 22 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{14}$–$r_{15}$) of positive refractive power. In order from the object side, the first lens element is of a planar-concave shape, the second lens element is of a planar-convex shape, and the third lens element is of a convex-concave shape. The plane-parallel plate ($r_8$–$r_9$) on the image-side of the second lens element is an interference-type filter, the next plane-parallel plate ($r_{10}$–$r_{11}$) is an absorbing-type, infrared cut-off filter, and the next plane-parallel plate ($r_{12}$–$r_{13}$) is an interference-type filter. Further, the two plane-parallel plates nearest the image are a cover glass ($r_{16}$–$r_{17}$) of a dust guard, and a cover glass ($r_{17}$–$r_{18}$) of an image pick-up element. The outer diameter of the positive lens elements of this embodiment is 1.6 mm.

TABLE 22

| # | R | D | $N_d$ | $\upsilon_d$ |
|---|---|---|---|---|
| 1 | ∞ | 0.3500 | 1.88300 | 40.76 |
| 2 | 1.9016 | 0.6099 | | |
| 3 | ∞ | 4.0390 | 1.88300 | 40.76 |
| 4 | ∞ | 0.2000 | | |
| 5 | ∞ (stop) | 0.0300 | | |
| 6 | ∞ | 1.2309 | 1.51633 | 64.14 |
| 7 | −1.4141 | 0.1000 | | |
| 8 | ∞ | 0.2000 | 1.52287 | 59.89 |
| 9 | ∞ | 0.0300 | | |
| 10 | ∞ | 0.4000 | 1.51400 | 75.00 |
| 11 | ∞ | 0.0300 | | |
| 12 | ∞ | 0.2000 | 1.52287 | 59.89 |
| 13 | ∞ | 0.1000 | | |
| 14 | 1.7054 | 0.4974 | 1.88300 | 40.76 |
| 15 | 7.1193 | 0.6214 | | |
| 16 | ∞ | 0.5000 | 1.51633 | 64.14 |
| 17 | ∞ | 0.4000 | 1.51633 | 64.14 |
| 18 | ∞ | | | | f = 0.657　　2ω = 100°　$F_{NO}$ = 3.92　IH = 0.5 mm　OB = 10 mm
$|R_{(3R)}/f|$ = 10.836　　$\upsilon(p)$ = 64.14　　$N_1$ = 1.883
$|R_{(1R)}/f|$ = 2.894　　$|f/f_1|$ = 0.305　　Dp/f = 4.498
$R_{(1R)}$ = 1.902 mm　　R(p) = 1.414 mm (second lens element)

Embodiment 23

Figure 23:
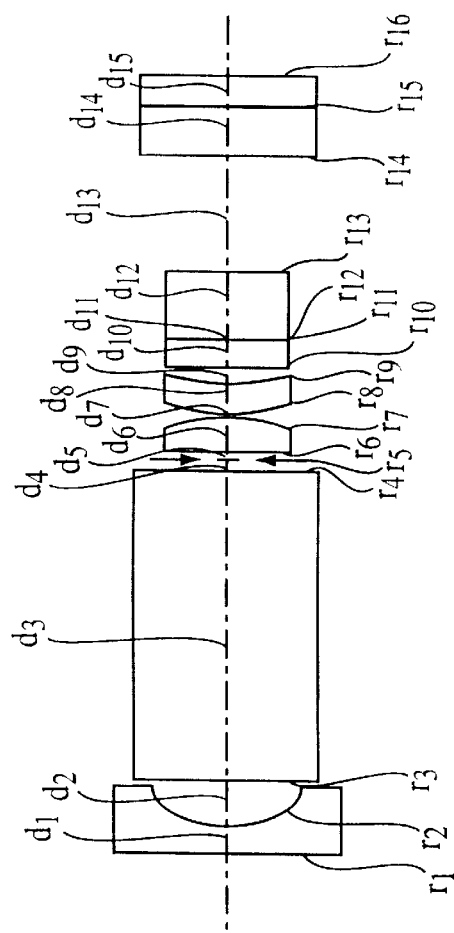
FIG. 23 shows the lens element construction of Embodiment 23.

FIG. 23 shows the retro-focus type objective optical system of Embodiment 23 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) positive refractive power, and a third lens element ($r_8$–$r_9$) of positive refractive power. In order from the object side, the first lens element is of a planar-concave shape, the second lens element is of a double-convex shape, and the third lens element is of a convex-concave shape. The plane-parallel plate ($r_{10}$–$r_{11}$) on the image-side of the third lens element is an interference-type filter, and the next plane-parallel plate ($r_{12}$–$r_{13}$) is an absorbing-type, infrared cut-off filter. Further, the two plane-parallel plates nearest the image are a cover glass ($r_{14}$–$r_{15}$) of a dust guard, and a cover glass ($r_{15}$–$r_{16}$) of an image pick-up element. The outer diameter of the positive lens elements of this embodiment is 1.7 mm.

TABLE 23

| # | R | D | $N_d$ | $v_d$ |
|---|---|---|---|---|
| 1 | ∞ | 0.4000 | 1.72916 | 54.68 |
| 2 | 1.1726 | 0.7320 | | |
| 3 | ∞ | 4.4880 | 1.88300 | 40.76 |
| 4 | ∞ | 0.1500 | | |
| 5 | ∞ (stop) | 0.1000 | | |
| 6 | 14.6431 | 0.5042 | 1.88300 | 40.76 |
| 7 | −2.9454 | 0.0500 | | |
| 8 | 2.6726 | 0.4488 | 1.83481 | 42.72 |
| 9 | 3.2697 | 0.2000 | | |
| 10 | ∞ | 0.4000 | 1.52287 | 59.89 |
| 11 | ∞ | 0.0300 | | |
| 12 | ∞ | 1.0000 | 1.49400 | 75.00 |
| 13 | ∞ | 1.6254 | | |
| 14 | ∞ | 0.7000 | 1.51633 | 64.14 |
| 15 | ∞ | 0.5000 | 1.51633 | 64.14 |
| 16 | ∞ | | | | f = 1.245   2ω = 100.1°   $F_{NO}$ = 4.37   IH = 1 mm   OB = 10 mm
$|R_{(3R)}/f|$ = 2.626   $v(p)$ = 42.72   $N_1$ = 1.729
$|R_{(1R)}/f|$ = 0.942   $|f/f_1|$ = 0.774   Dp/f = 2.623
$R_{(1R)}$ = 1.173 mm

Embodiment 24

Figure 24:
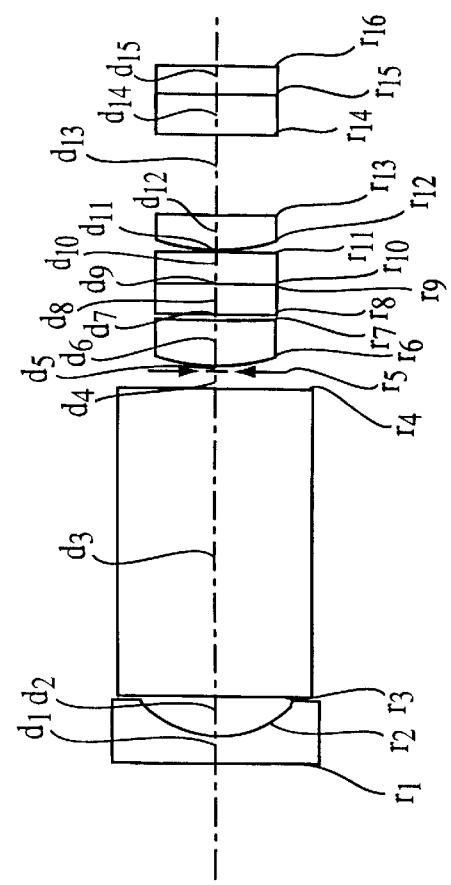
FIG. 24 shows the lens element construction of Embodiment 24.

FIG. 24 shows the retro-focus type objective optical system of Embodiment 24 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{12}$–$r_{13}$) of positive refractive power. In order from the object side, the first lens element is of a planar-concave shape, the second lens element is of a convex-planar shape, and the third lens element is of a convex-concave shape. The plane-parallel plate ($r_8$–$r_9$) on the image-side of the third lens element is an interference-type filter, and the next plane-parallel plate ($r_{10}$–$r_{11}$) is an absorbing-type, infrared cut-off filter. Further, the two plane-parallel plates nearest the image are a cover glass ($r_{14}$–$r_{15}$) of a dust guard, and a cover glass ($r_{15}$–$r_{16}$) of an image pick-up element. The outer diameter of the positive lens elements of this embodiment is 1.4 mm.

TABLE 24

| # | R | D | $N_d$ | $v_d$ |
|---|---|---|---|---|
| 1 | ∞ | 0.3000 | 1.88300 | 40.76 |
| 2 | 1.0731 | 0.5796 | | |
| 3 | ∞ | 4.0390 | 1.88300 | 40.76 |
| 4 | ∞ | 0.2000 | | |
| 5 | ∞ (stop) | 0.0500 | | |
| 6 | 2.0317 | 0.6447 | 1.81600 | 46.62 |
| 7 | ∞ | 0.0687 | | |
| 8 | ∞ | 0.4000 | 1.52287 | 59.89 |
| 9 | ∞ | 0.0300 | | |
| 10 | ∞ | 0.4000 | 1.51400 | 75.00 |
| 11 | ∞ | 0.0300 | | |
| 12 | 2.0312 | 0.5094 | 1.88300 | 40.76 |
| 13 | 7.5718 | 0.9475 | | |
| 14 | ∞ | 0.5000 | 1.51633 | 64.14 |
| 15 | ∞ | 0.4000 | 1.51633 | 64.14 |
| 16 | ∞ | | | | f = 0.651   2ω = 100°   $F_{NO}$ = 3.23   IH = 0.5 mm   OB = 10 mm
$|R_{(3R)}/f|$ = 11.631   $v(p)$ = 46.62   $N_1$ = 1.883
$|R_{(1R)}/f|$ = 1.648   $|f/f_1|$ = 0.536   Dp/f = 4.492
$R_{(1R)}$ = 1.073 mm   R(p) = 2.032 mm (second lens element)

Embodiment 25

Figure 25:
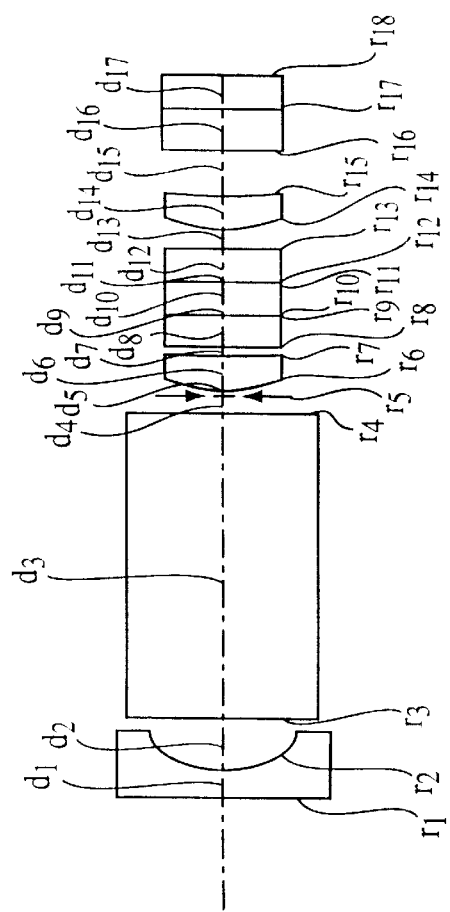
FIG. 25 shows the lens element construction of Embodiment 25.

FIG. 25 shows the retro-focus type objective optical system of Embodiment 25 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{14}$–$r_{15}$) of positive refractive power. In order from the object side, the first lens element is of a planar-concave shape, the second lens element is of a convex-concave shape, and the third lens element is of a convex-concave shape. The plane-parallel plate ($r_8$–$r_9$) on the image-side of the second lens element is an interference-type filter, the next plane-parallel plate ($r_{10}$–$r_{11}$) is an absorbing-type, infrared cut-off filter, and the next plane-parallel plate ($r_{12}$–$r_{13}$) is an interference-type filter. Further, the two plane-parallel plates nearest the image are a cover glass ($r_{16}$–$r_{17}$) of a dust guard, and a cover glass ($r_{17}$–$r_{18}$) of an image pick-up element. The outer diameter of the positive lens elements of this embodiment is 1.4 mm.

TABLE 25

| # | R | D | $N_d$ | $v_d$ |
|---|---|---|---|---|
| 1 | ∞ | 0.3000 | 1.88300 | 40.76 |
| 2 | 1.2489 | 0.5958 | | |
| 3 | ∞ | 4.0390 | 1.88300 | 40.76 |
| 4 | ∞ | 0.2000 | | |
| 5 | ∞ (stop) | 0.0500 | | |
| 6 | 1.7203 | 0.4897 | 1.88300 | 40.76 |
| 7 | 7.4565 | 0.1000 | | |
| 8 | ∞ | 0.4000 | 1.52287 | 59.89 |
| 9 | ∞ | 0.0300 | | |
| 10 | ∞ | 0.4000 | 1.51400 | 75.00 |
| 11 | ∞ | 0.0300 | | |
| 12 | ∞ | 0.4000 | 1.52287 | 59.89 |
| 13 | ∞ | 0.2520 | | |
| 14 | 1.6711 | 0.4317 | 1.88300 | 40.76 |
| 15 | 7.6612 | 0.5947 | | |
| 16 | ∞ | 0.5000 | 1.51633 | 64.14 |
| 17 | ∞ | 0.4000 | 1.51633 | 64.14 |
| 18 | ∞ | | | | f = 0.661   2ω = 100°   $F_{NO}$ = 4.11   IH = 0.5 mm   OB = 10 mm
$|R_{(3R)}/f|$ = 11.590   $v(p)$ = 40.76   $N_1$ = 1.883
$|R_{(1R)}/f|$ = 1.889   $|f/f_1|$ = 0.467   DP/f = 4.449
$R_{(1R)}$ = 1.249 mm

Embodiment 26

Figure 26:
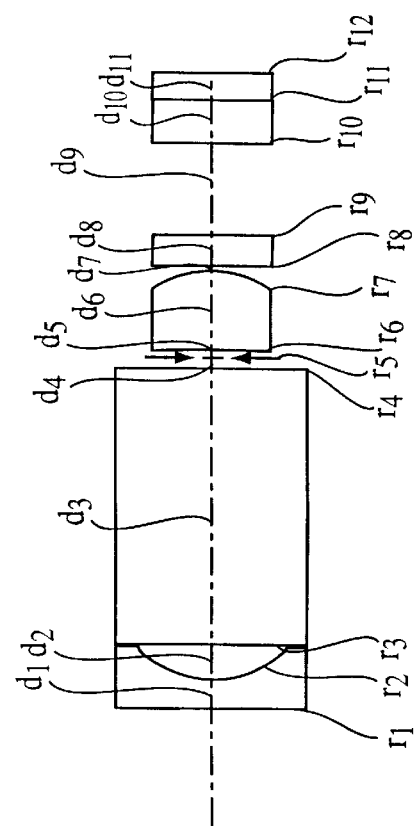
FIG. 26 shows the lens element construction of Embodiment 26.

FIG. 26 shows the retro-focus type objective optical system of Embodiment 26 which includes, in relative order from the object side, a first lens element ($r_1$–$r_2$) of negative refractive power, a visual field conversion optical element ($r_3$–$r_4$), a stop ($r_5$), and a second lens element ($r_6$–$r_7$) of positive refractive power. In order from the object side, the first lens element is of a planar-concave shape, and the second lens element is of a concave-convex shape. The plane-parallel plate ($r_8$–$r_9$) on the image-side of the second lens element is an absorbing-type, infrared cut-off filter that has applied to both sides thereof an interference-type filter. Further, the two plane-parallel plates nearest the image are a cover glass ($r_{10}$–$r_{11}$) of a dust guard, and a cover glass ($r_{11}$–$r_{12}$) of an image pick-up element. The outer diameter of the positive lens element of this embodiment is 1.4 mm.

TABLE 26

| # | R | D | $N_d$ | $v_d$ |
|---|---|---|---|---|
| 1 | ∞ | 0.2500 | 1.88300 | 40.76 |
| 2 | 1.2811 | 0.5287 | | |
| 3 | ∞ | 3.5630 | 1.88300 | 40.76 |
| 4 | ∞ | 0.1000 | | |
| 5 | ∞ (stop) | 0.1000 | | |
| 6 | −9.4131 | 1.0028 | 1.83481 | 42.72 |
| 7 | −1.1013 | 0.1000 | | |

TABLE 26-continued

| # | R | D | $N_d$ | $v_d$ |
|---|---|---|---|---|
| 8 | ∞ | 0.4000 | 1.52287 | 59.89 |
| 9 | ∞ | 1.1204 | | |
| 10 | ∞ | 0.5000 | 1.51633 | 64.14 |
| 11 | ∞ | 0.4000 | 1.51633 | 64.14 |
| 12 | ∞ | | | | f = 0.634  2ω = 99.9°  $F_{NO}$ = 3.82  IH = 0.5 mm  OB =
           $v(p)$ = 42.72  $N_1$ = 1.883  10 mm
$|R_{(1R)}/f|$ = 2.021  $|f/f_1|$ = 0.437  Dp/f = 3.976
$R_{(1R)}$ = 1.281 mm

Embodiment 27

Figure 27:
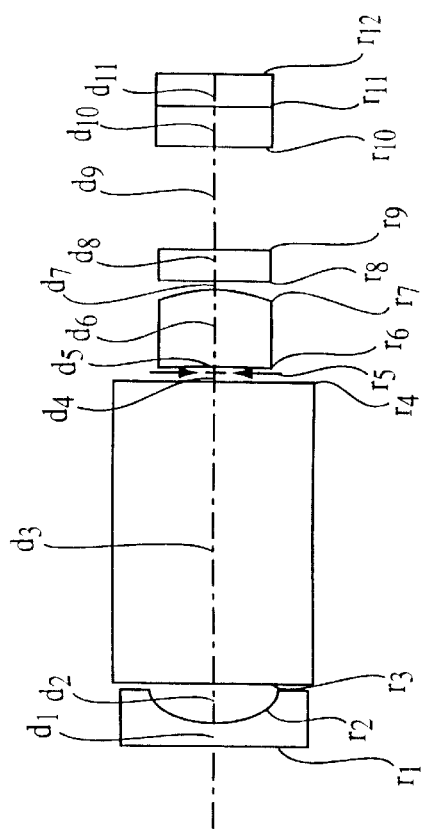
FIG. 27 shows the lens element construction of Embodiment 27.

FIG. 27 shows the retro-focus type objective optical system of Embodiment 27 which includes, in relative order from the object side, a first lens element ($r_1$–$r_2$) of negative refractive power, a visual field conversion optical element ($r_3$–$r_4$), a stop ($r_5$), and a second lens element ($r_6$–$r_7$) of a positive refractive power. In order from the object side, the first lens element is of a planar-concave shape. and the second lens element is of a planar-convex shape. The plane-parallel plate ($r_8$–$r_9$) on the image side of the second lens element is an absorbing-type, infrared cut-off filter that has applied both sides thereof an interference-type filter. Further, the two plane-parallel plates nearest the image are a cover glass ($r_{10}$–$r_{11}$) of a dust guard, and a cover glass ($r_{11}$–$r_{12}$) of an image pick-up element. The outer diameter of the positive lens element of this embodiment is 1.4 mm.

TABLE 27

| # | R | D | $N_d$ | $v_d$ |
|---|---|---|---|---|
| 1 | ∞ | 0.3000 | 1.88300 | 40.76 |
| 2 | 1.1153 | 0.4299 | | |
| 3 | ∞ | 3.7630 | 1.88300 | 40.76 |
| 4 | ∞ | 0.1000 | | |
| 5 | ∞ (stop) | 0.0500 | | |
| 6 | ∞ | 1.0284 | 1.88300 | 40.76 |
| 7 | −1.2974 | 0.1000 | | |
| 8 | ∞ | 0.4000 | 1.52287 | 59.89 |
| 9 | ∞ | 1.2320 | | |
| 10 | ∞ | 0.5000 | 1.51633 | 64.14 |
| 11 | ∞ | 0.4000 | 1.51633 | 64.14 |
| 12 | ∞ | | | | f = 0.636  2ω = 100°  $F_{NO}$ = 4.21  IH = 0.5 mm  OB = 10 mm
           $v(p)$ = 40.76  $N_1$ = 1.883
$|R_{(1R)}/f|$ = 1.754  $|f/f_1|$ = 0.504  Dp/f = 3.975
$R_{(1R)}$ = 1.115 mm  R(p) = 1.297 mm (second lens element)

Embodiment 28

Figure 28:
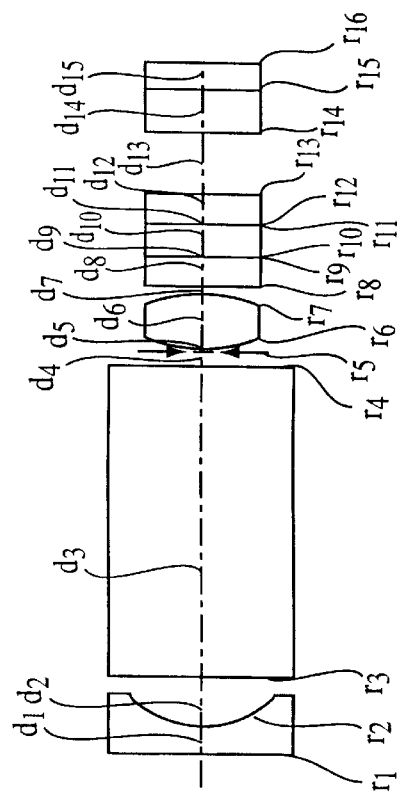
FIG. 28 shows the lens element construction of Embodiment 28.

FIG. 28 shows the retro-focus type objective optical system of Embodiment 28 which includes, in relative order from the object side, a first lens element ($r_1$–$r_2$) of negative refractive power, a visual field conversion optical element ($r_3$–$r_4$), a stop ($r_5$), and a second lens element ($r_6$–$r_7$) of positive refractive power. In order from the object side, the first lens element is of a planar-concave shape, and the second lens element is of a double-convex shape. The plane-parallel plate ($r_{10}$–$r_{11}$) is an absorbing-type, infrared cut-off filter that has applied to both sides thereof an interference-type filter. Further, the two plane-parallel plates nearest the image are a cover glass ($r_{14}$–$r_{15}$) of a dust guard, and a cover glass ($r_{15}$–$r_{16}$) of an image pick-up element. The outer diameter of the positive lens element of this embodiment is 1.4 mm.

TABLE 28

| # | R | D | $N_d$ | $v_d$ |
|---|---|---|---|---|
| 1 | ∞ | 0.3000 | 1.88300 | 40.76 |
| 2 | 0.9748 | 0.6682 | | |
| 3 | ∞ | 4.0390 | 1.88300 | 40.76 |
| 4 | ∞ | 0.2000 | | |
| 5 | ∞ (stop) | 0.0500 | | |
| 6 | 2.4323 | 0.6869 | 1.88300 | 40.76 |
| 7 | −2.9398 | 0.1000 | | |
| 8 | ∞ | 0.4000 | 1.52287 | 59.89 |
| 9 | ∞ | 0.0300 | | |
| 10 | ∞ | 0.4000 | 1.51400 | 75.00 |
| 11 | ∞ | 0.0300 | | |
| 12 | ∞ | 0.4000 | 1.52287 | 59.89 |
| 13 | ∞ | 0.7739 | | |
| 14 | ∞ | 0.5000 | 1.51633 | 64.14 |
| 15 | ∞ | 0.4000 | 1.51633 | 64.14 |
| 16 | ∞ | | | | f = 0.646  2ω = 100.2°  $F_{NO}$ = 4.09  IH = 0.5 mm  OB =
           $v(p)$ = 40.76  $N_1$ = 1.883  10 mm
$|R_{(1R)}/f|$ = 1.509  $|f/f_1|$ = 0.585  Dp/f = 4.664
$R_{(1R)}$ = 0.975 mm

Embodiment 29

Figure 29:
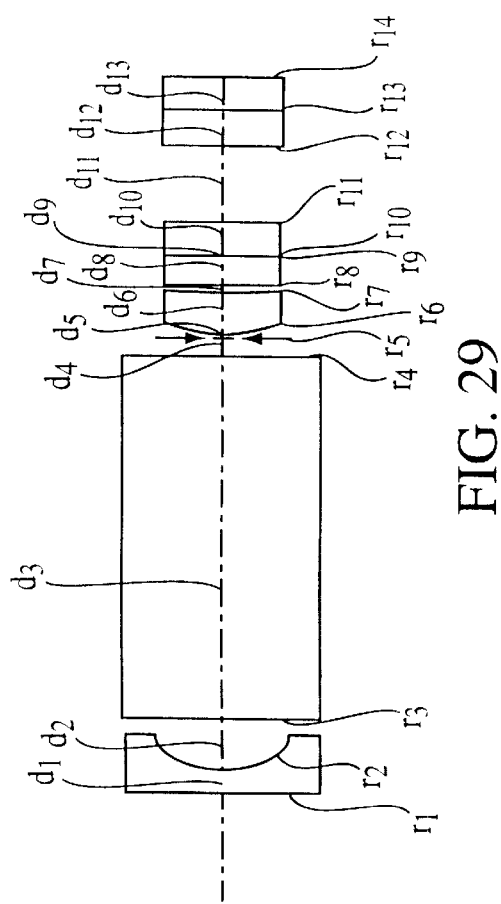
FIG. 29 shows the lens element construction of Embodiment 29.

FIG. 29 shows the retro-focus type objective optical system of Embodiment 29 which includes, in relative order from the object side, a first lens element ($r_1$–$r_2$) of negative refractive power, a visual field conversion optical element ($r_3$–$r_4$), a stop ($r_5$), and a second lens element ($r_6$–$r_7$) of positive refractive power. In order from the object side, the first lens element is of a planar-concave shape, and the second lens element is of a convex-planar shape. The plane-parallel plate ($r_8$–$r_9$) on the image-side of the second lens element is an interference-type filter, and the plane-parallel plate ($r_{10}$–$r_{11}$) is an absorbing-type, infrared cut-off filter. Further, the two plane-parallel plates nearest the image are a cover glass ($r_{12}$–$r_{13}$) of a dust guard, and a cover glass ($r_{13}$–$r_{14}$) of an image pick-up element. The outer diameter of the positive lens element of this embodiment is 1.4 mm.

TABLE 29

| # | R | D | $N_d$ | $v_d$ |
|---|---|---|---|---|
| 1 | ∞ | 0.3000 | 1.88300 | 40.76 |
| 2 | 0.9188 | 0.7000 | | |
| 3 | ∞ | 4.8410 | 1.88300 | 40.76 |
| 4 | ∞ | 0.2000 | | |
| 5 | ∞ (stop) | 0.0500 | | |
| 6 | 1.4439 | 0.5733 | 1.88300 | 40.76 |
| 7 | ∞ | 0.1000 | | |
| 8 | ∞ | 0.4000 | 1.52287 | 59.89 |
| 9 | ∞ | 0.0300 | | |
| 10 | ∞ | 0.4000 | 1.51400 | 75.00 |
| 11 | ∞ | 0.9752 | | |
| 12 | ∞ | 0.5000 | 1.51633 | 64.14 |
| 13 | ∞ | 0.4000 | 1.51633 | 64.14 |
| 14 | ∞ | | | | f = 0.581  2ω = 120.4°  $F_{NO}$ = 4.27  IH = 0.5 mm  OB =
           $v(p)$ = 40.76  $N_1$ = 1.883  10 mm
$|R_{(1R)}/f|$ = 1.581  $|f/f_1|$ = 0.558  Dp/f = 5.974
$R_{(1R)}$ = 0.919 mm  R(p) = 1.444 mm (second lens element)

Embodiment 30

Figure 30:
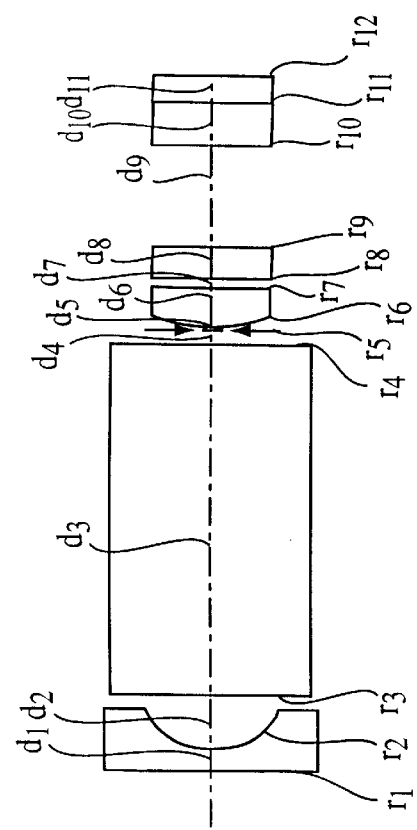
FIG. 30 shows the lens element construction of Embodiment 30.

FIG. 30 shows the retro-focus type objective optical system of Embodiment 30 which includes, in relative order from the object side, a first lens element ($r_1$–$r_2$) of negative refractive power, a visual field conversion optical element ($r_3$–$r_4$), a stop ($r_5$), and a second lens element ($r_6$–$r_7$) of positive refractive power. In order from the object side, the first lens element is of a planar-concave shape, and the second lens element is of a convex-concave shape. The plane-parallel plate ($r_8$–$r_9$) on the image-side of the second lens element is an absorbing-type, infrared cut-off filter having an interference-type filter (not separately illustrated) deposited on each surface thereof Further, the two plane-parallel plates nearest the image are a cover glass ($r_{10}$–$r_{11}$) of a dust guard, and a cover glass ($r_{11}$–$r_{12}$) of an image pick-up element. The outer diameter of the positive lens element of this embodiment is 1.4 mm.

TABLE 30

| # | R | D | $N_d$ | $v_d$ |
|---|---|---|---|---|
| 1 | ∞ | 0.3000 | 1.88300 | 40.76 |
| 2 | 0.8285 | 0.7000 | | |
| 3 | ∞ | 4.3390 | 1.88300 | 40.76 |
| 4 | ∞ | 0.2000 | | |
| 5 | ∞ (stop) | 0.0500 | | |
| 6 | 1.2429 | 0.5523 | 1.88300 | 40.76 |
| 7 | 8.8763 | 0.1000 | | |
| 8 | ∞ | 0.4000 | 1.52287 | 59.89 |
| 9 | ∞ | 1.2684 | | |
| 10 | ∞ | 0.5000 | 1.51633 | 64.14 |
| 11 | ∞ | 0.4000 | 1.51633 | 64.14 |
| 12 | ∞ | | | | f = 0.58   2ω = 120.3°   $F_{NO}$ = 5.2   IH = 0.5 mm   OB = 10 mm
         υ(p) = 40.76              $N_1$ = 1.883
$|R_{(1R)}/f|$ = 1.428   $|f/f_1|$ = 0.618   Dp/f = 5.525
$R_{(1R)}$ = 0.829 mm

Embodiment 31

Figure 31:
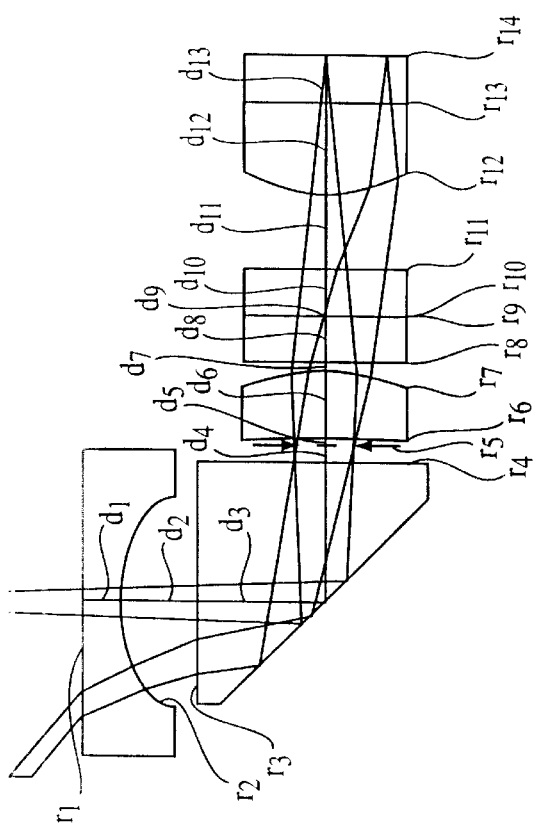
FIG. 31 shows the lens element construction of Embodiment 31.
Figure 41:
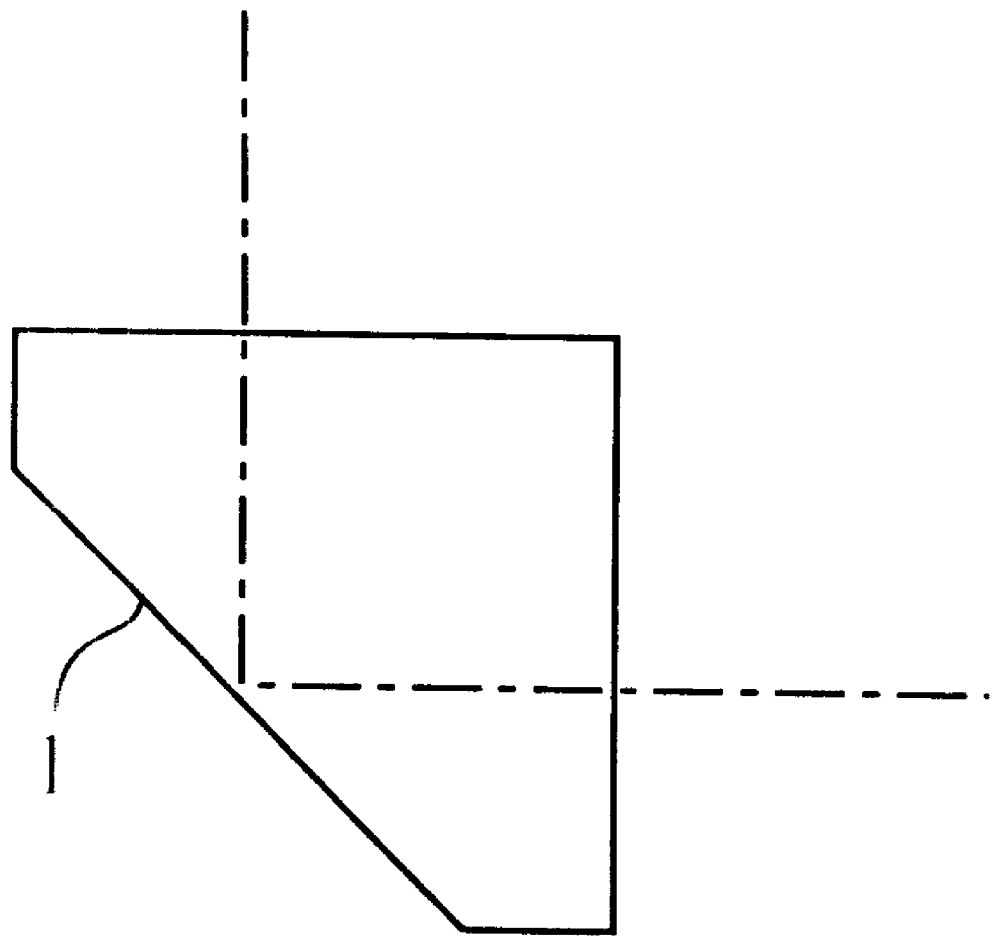
FIG. 41 shows a third example of a third visual field conversion optical element that may be used with the present invention.

FIG. 31 shows the retro-focus type objective optical system of Embodiment 31 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{12}$–$r_{13}$) of positive refractive power. In order from the object side, the first lens element is of a planar-concave shape, the second lens element is of a planar-convex shape, and the third lens element is of a convex-planar shape. The plane-parallel plate ($r_8$–$r_9$) on the image-side of the second lens element is an absorbing-type, infrared cut-off filter, and the next plane-parallel plate ($r_{10}$–$r_{11}$) is also an absorbing-type, infrared cut-off filter. Further, the third lens element is joined to the cover glass ($r_{13}$–$r_{14}$) of an image pick-up element, such as a CCD device. The outer diameter of the positive lens elements of this embodiment is 1.4 mm. In this example, as shown in FIG. 41, the visual field conversion optical element uses a one-time reflecting prism. However, although the image detected is a mirror image (in which there is an inversion from left to right), the detected image is then inverted by electronic means, as mentioned above.

TABLE 31

| # | R | D | $N_d$ | $v_d$ |
|---|---|---|---|---|
| 1 | ∞ | 0.3500 | 1.88300 | 40.76 |
| 2 | 1.3725 | 0.5886 | | |
| 3 | ∞ | 2.3000 | 1.88300 | 40.76 |
| 4 | ∞ | 0.1500 | | |
| 5 | ∞ (stop) | 0.0500 | | |
| 6 | ∞ | 0.6108 | 1.88300 | 40.76 |
| 7 | −1.3173 | 0.0497 | | |
| 8 | ∞ | 0.4000 | 1.52287 | 59.89 |
| 9 | ∞ | 0.0300 | | |
| 10 | ∞ | 0.4000 | 1.52287 | 59.89 |
| 11 | ∞ | 0.6357 | | |
| 12 | 1.2048 | 0.7804 | 1.51633 | 64.14 |
| 13 | ∞ | 0.4000 | 1.51633 | 64.14 |
| 14 | ∞ | | | |

TABLE 31-continued

| # | R | D | $N_d$ | $v_d$ |
|---|---|---|---|---| f = 0.643   2ω = 99.8°   $F_{NO}$ = 2.93   IH = 0.5 mm   OB = 10 mm
         υ(p) = 64.14              $N_1$ = 1.883
$|R_{(1R)}/f|$ = 2.135   $|f/f_1|$ = 0.414   Dp/f = 3.048
$R_{(1R)}$ = 1.373 mm   R(p) = 1.317 mm (second lens element)
                     R(p) = 1.205 mm (third lens element)

Embodiment 32

Figure 32:
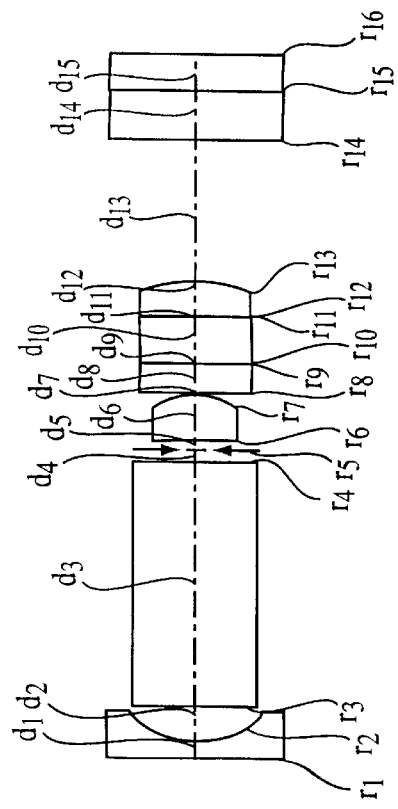
FIG. 32 shows the lens element construction of Embodiment 32.

FIG. 32 shows the retro-focus type objective optical system of Embodiment 32 which includes, in relative order from the object side, a first lens element ($r_1$–$r_2$) of negative refractive power, a visual field conversion optical element ($r_3$–$r_4$), a stop ($r_5$), a second lens element ($r_6$–$r_7$) of positive refractive power, and a third lens element ($r_{12}$–$r_{13}$) of positive refractive power. In order from the object side, the first lens element is of a planar-concave shape, the second lens element is of a planar-convex shape, and the third lens element is of a planar-convex shape. The plane-parallel plate ($r_8$–$r_9$) on the image-side of the second lens element is an interference-type filter, and the next plane parallel plate ($r_{10}$–$r_{11}$) is an absorbing-type, infrared cut-off filter. Further, the two plane-parallel plates nearest the image are a cover glass ($r_{14}$–$r_{15}$) of a dust guard, and a cover glass ($r_{15}$–$r_{16}$) of an image pick-up element. The outer diameter of the second and third lens elements, both of positive refractive power, is 1.2 mm and 1.6 mm, respectively.

TABLE 32

| # | R | D | $N_d$ | $v_d$ |
|---|---|---|---|---|
| 1 | ∞ | 0.2800 | 1.88300 | 40.76 |
| 2 | 1.4218 | 0.4493 | | |
| 3 | ∞ | 3.6100 | 1.88300 | 40.76 |
| 4 | ∞ | 0.1500 | | |
| 5 | ∞ (stop) | 0.1000 | | |
| 6 | ∞ | 0.6769 | 1.58913 | 61.14 |
| 7 | −1.4741 | 0.0498 | | |
| 8 | ∞ | 0.4000 | 1.52287 | 59.89 |
| 9 | ∞ | 0.0300 | | |
| 10 | ∞ | 0.6200 | 1.51400 | 75.00 |
| 11 | ∞ | 0.0500 | | |
| 12 | ∞ | 0.4838 | 1.51633 | 64.14 |
| 13 | −4.2495 | 2.1010 | | |
| 14 | ∞ | 0.7000 | 1.51633 | 64.14 |
| 15 | ∞ | 0.5000 | 1.51633 | 64.14 |
| 16 | ∞ | | | | f = 1.231   2ω = 100.4°   $F_{NO}$ = 6.5   IH = 1 mm   OB = 10 mm
$|R_{(3R)}/f|$ = 3.452   υ(p) = 64.14              $N_1$ = 1.883
$|R_{(1R)}/f|$ = 1.155   $|f/f_1|$ = 0.765   Dp/f = 2.044
$R_{(1R)}$ = 1.422 mm   R(p) = 1.474 mm (second lens element)
                     R(p) = 4.250 mm (third lens element)

Embodiment 33

Figure 33:
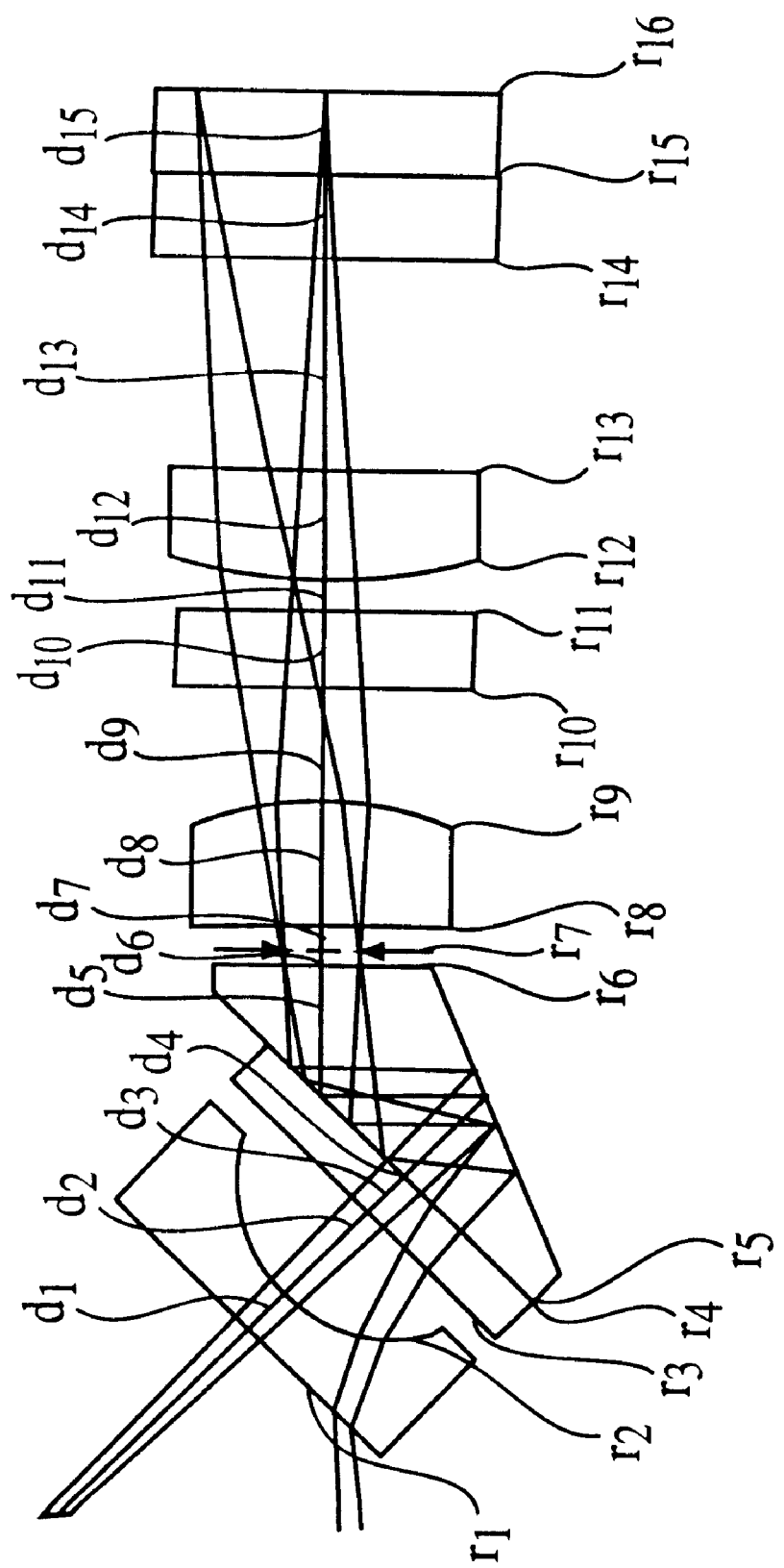
FIG. 33 shows the lens element construction of Embodiment 33.

FIG. 33 shows the retro-focus type objective optical system of Embodiment 33 which includes, in relative order from the object side, a first lens element ($r_1$–$r_2$) of negative refractive power, a visual field conversion optical element ($r_5$–$r_6$), a stop ($r_7$), a second lens element ($r_8$–$r_9$) of positive refractive power, and a third lens element ($r_{12}$–$r_{13}$) of positive refractive power. In order from the object side, the first lens element is of a planar-concave shape, the second lens element is of a planar-convex shape, and the third lens element is of a convex-planar shape. The plane-parallel plate ($r_3$–$r_4$) on the image-side of the first lens element is an interference-type filter, and the next plane-parallel plate ($r_{10}$–$r_1$) is an absorbing-type, infrared cut-off filter. Further, the two plane-parallel plates nearest the image are a cover glass ($r_{14}$–$r_{15}$) of a dust guard, and a cover glass ($r_{15}$–$r_{16}$) of an image pick-up element. The second and third lens elements are both of positive refractive power. The outer diameter of the second lens element is 2 mm, and the outer diameter of the third lens element is 2.4 mm. In this embodiment the visual field conversion optical element uses a twice-reflecting prism which forms an uninverted image of an object field that is centered at about a 45 degree angle to the optical axis of the image. Depending on the design of the twice-reflecting prism, the optical axis of the object field can be any direction from 0 degrees to nearly 180 degrees to the optical axis of the image (i.e., the in-line direction) by choosing a desired design for the visual field conversion optical element.

TABLE 33

| # | R | D | $N_d$ | $\upsilon_d$ |
|---|---|---|---|---|
| 1 | ∞ | 0.4000 | 1.88300 | 40.76 |
| 2 | 1.4055 | 0.9106 | | |
| 3 | ∞ | 0.4000 | 1.51633 | 64.14 |
| 4 | ∞ | 0.0400 | | |
| 5 | ∞ | 3.3313 | 1.88300 | 40.76 |
| 6 | ∞ | 0.1000 | | |
| 7 | ∞ (stop) | 0.2000 | | |
| 8 | ∞ | 1.0527 | 1.88300 | 40.76 |
| 9 | −2.5247 | 0.9208 | | |
| 10 | ∞ | 0.6200 | 1.51400 | 75.00 |
| 11 | ∞ | 0.3000 | | |
| 12 | 5.5668 | 0.9115 | 1.51633 | 64.14 |
| 13 | ∞ | 1.6870 | | |
| 14 | ∞ | 0.7000 | 1.51633 | 64.14 |
| 15 | ∞ | 0.7000 | 1.53172 | 48.91 |
| 16 | ∞ | | | | f = 1.255   2ω = 100.4°   $F_{NO}$ = 6.29   IH = 1 mm   OB =
                          υ(p) = 64.14   $N_1$ = 1.883   10 mm
$|R_{(1R)}/f|$ = 1.120   $|f/f_1|$ = 0.788   Dp/f = 2.457
$R_{(1R)}$ = 1.406 mm   R(p) = 2.525 mm (second lens element)
                        R(p) = 5.567 mm (third lens element)

Embodiment 34

Figure 34:
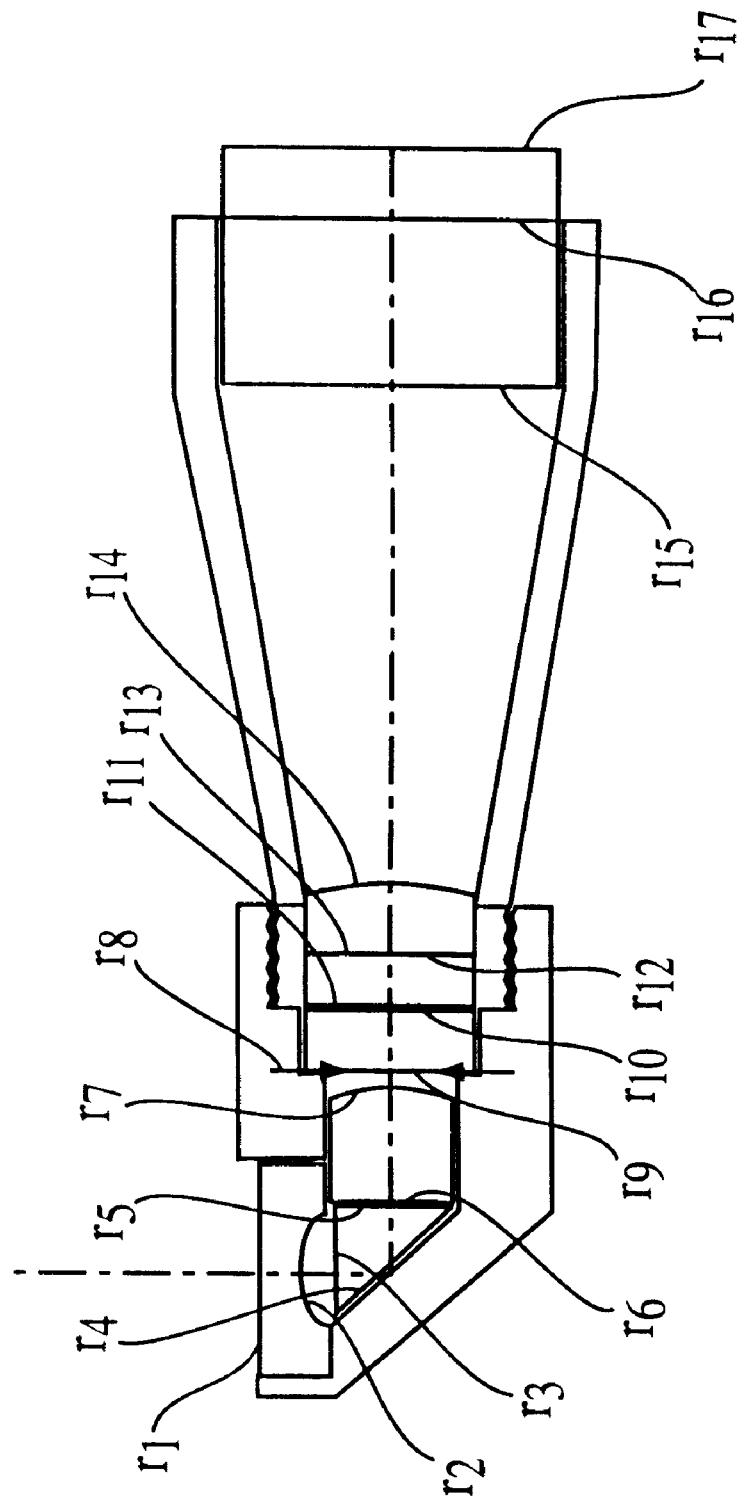
FIG. 34 shows the lens element construction of Embodiment 34.

FIG. 34 shows the objective optical system of Embodiment 34 which includes, in relative order from the object side, a first lens element ($r_1$–$r_2$) of negative refractive power and plano-concave shape, a visual field conversion optical element ($r_3$–$r_5$), a second lens element ($r_6$–$r_7$) of positive refractive power and biconvex shape, a stop ($r_8$), two cover glasses ($r_9$–$r_{10}$), ($r_{11}$–$r_{12}$), a third lens element ($r_{13}$–$r_{14}$) of positive refractive power and plano-convex shape, and an absorbing-type infrared cut-off filter ($r_{15}$–$r_{16}$) that is joined to a CCD cover glass ($r_{16}$–$r_{17}$). The objective optical system is constructed in two parts, a front part and a back part, and these two parts can be separated between the cover glasses ($r_9$–$r_{10}$) and the cover glass ($r_{11}$–$r_{12}$), each being formed as plane-parallel plates. The front part ($r_1$ through $r_{10}$) is made to be an adaptor unit, the back part ($r_{11}$–$r_{17}$) is made to be a master unit, with the adaptor unit being selected according to the particular intended use. Although this embodiment has a watertight construction by arranging a cover glass at the dividing part of each unit, the cover glasses may not be needed depending on the purpose for which it is used. The outer diameter of the lens element of positive refractive power in the master unit in this embodiment is 1 mm.

TABLE 34

| # | R | D | $N_d$ | $\upsilon_d$ |
|---|---|---|---|---|
| Object | ∞ | 10.0000 | | |
| 1 | ∞ | 0.2500 | 1.88300 | 40.76 |
| 2 | 0.6511 | 0.1500 | | |

TABLE 34-continued

| # | R | D | $N_d$ | $\upsilon_d$ |
|---|---|---|---|---|
| 3 | ∞ | 0.3500 | 1.88300 | 40.76 |
| 4 | ∞ | 0.3500 | 1.88300 | 40.76 |
| 5 | ∞ | 0.0500 | | |
| 6 | 2.7174 | 0.7000 | 1.51633 | 64.14 |
| 7 | −1.1199 | 0.1000 | | |
| 8 (stop) | ∞ | 0.0300 | | |
| 9 | ∞ | 0.3000 | 1.51633 | 64.14 |
| 10 | ∞ | 0.0500 | | |
| 11 | ∞ | 0.3000 | 1.51633 | 64.14 |
| 12 | ∞ | 0.0300 | | |
| 13 | ∞ | 0.3814 | 1.51633 | 64.14 |
| 14 | −2.0653 | 3.0069 | | |
| 15 | ∞ | 1.0000 | 1.49400 | 75.00 |
| 16 | ∞ | 0.4000 | 1.51633 | 64.14 |
| 17 | ∞ | 0.0000 | | |
| Image | ∞ | 0.0000 | | |

$F_{NO}$ = 8   IH = 0.9

Embodiment 35

Figure 35:
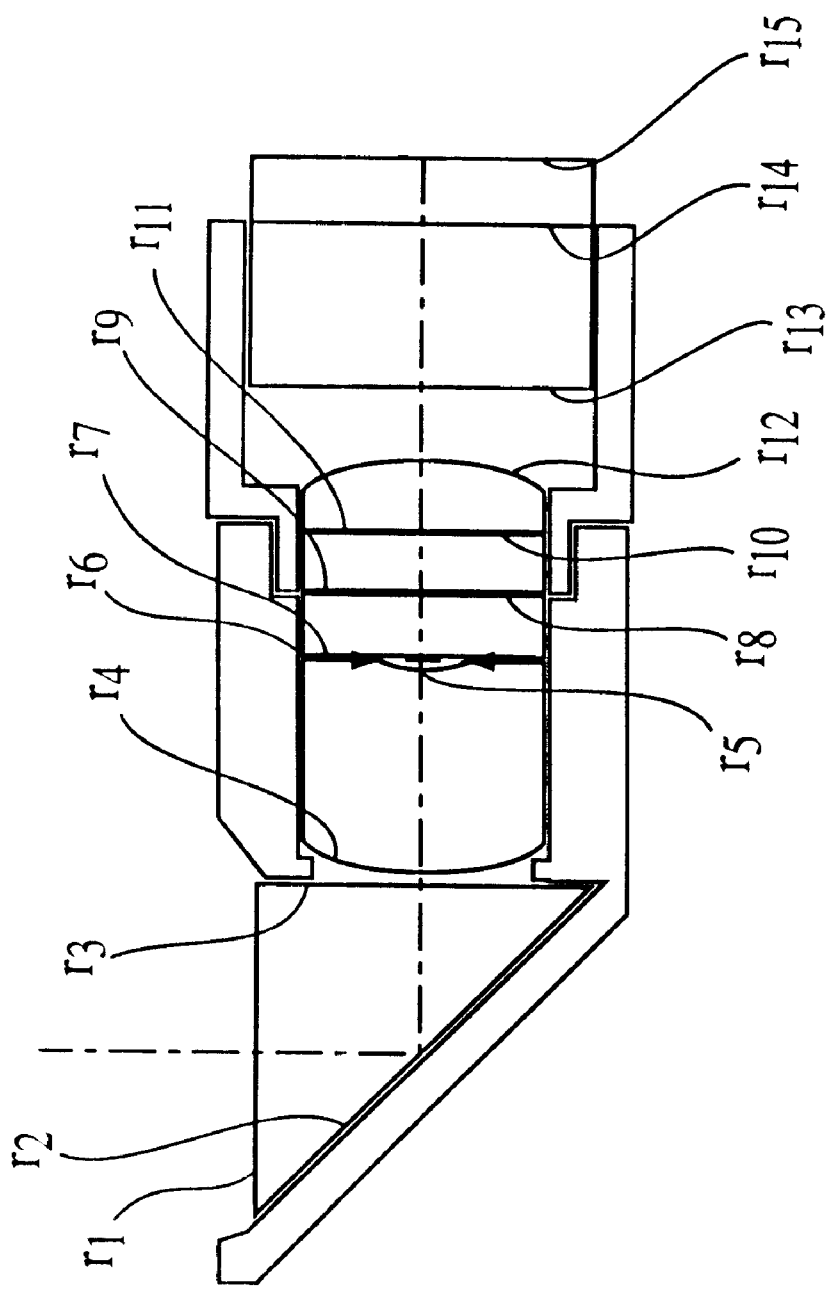
FIG. 35 shows the lens element construction of Embodiment 35.
Figure 36:
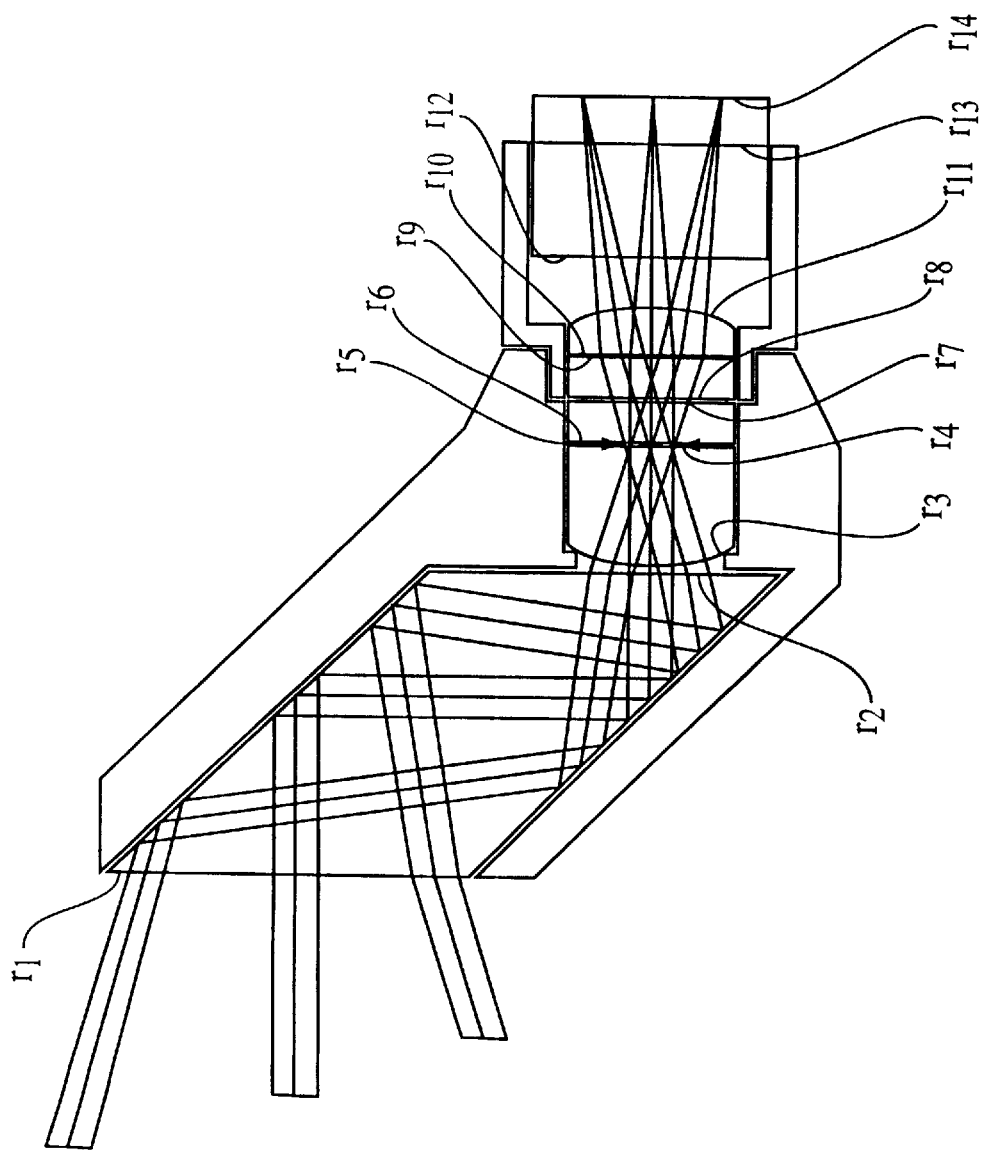
FIG. 36 shows the lens element construction of Embodiment 36.

FIG. 35 shows the objective optical system of Embodiment 35 which includes, in relative order from the object side, a visual field conversion optical element ($r_1$–$r_3$), a first lens element ($r_4$–$r_5$) of negative refractive power and convex-concave shape, a stop ($r_6$), two cover glasses ($r_7$–$r_8$), ($r_9$–$r_{10}$), a second lens element ($r_{11}$–$r_{12}$) of positive refractive power and plano-convex shape, an absorbing-type infrared cut-off filter ($r_{13}$–$r_{14}$), and a CCD cover glass ($r_{14}$–$r_{15}$). The infrared cut-off ($r_{13}$–$r_{14}$) is formed of a plane-parallel plate that is joined to the CCD cover glass ($r_{14}$–$r_{15}$), which is also a plane-parallel plate. The objective optical system is constructed in two parts, a front part and a back part, and these two parts can be separated between the cover glass ($r_7$–$r_8$) and the cover glass ($r_9$–$r_{10}$), each of these cover glasses being formed as a plane-parallel plate. The front part ($r_1$ through $r_8$) is made to be an adaptor unit, the back part ($r_9$–$r_{15}$) is made to be a master unit, with the adaptor unit being selected according to the particular intended use. Although this embodiment has a watertight construction by arranging a cover glass at the dividing part of each unit, the cover glass may not be needed depending on the purpose for which it is used. The outer diameter of the lens element of positive refractive power in the master unit in this embodiment is 1.4 mm.

TABLE 35

| # | R | D | $N_d$ | $\upsilon_d$ |
|---|---|---|---|---|
| Object | ∞ | 10.0000 | | |
| 1 | ∞ | 1.0000 | 1.88300 | 40.76 |
| 2 | ∞ | 1.0000 | 1.88300 | 40.76 |
| 3 | ∞ | 0.0500 | | |
| 4 | 1.5896 | 1.2382 | 1.88300 | 40.76 |
| 5 | 1.0000 | 0.0492 | | |
| 6 (stop) | ∞ | 0.0300 | | |
| 7 | ∞ | 0.3500 | 1.51633 | 64.14 |
| 8 | ∞ | 0.0500 | | |
| 9 | ∞ | 0.3500 | 1.51633 | 64.14 |
| 10 | ∞ | 0.0300 | | |
| 11 | ∞ | 0.3974 | 1.88300 | 40.76 |
| 12 | −1.2362 | 0.9000 | | |
| 13 | ∞ | 1.0000 | 1.49400 | 75.00 |
| 14 | ∞ | 0.4000 | 1.51633 | 64.14 |
| 15 | ∞ | 0.0000 | | |
| Image | ∞ | 0.0000 | | |

$F_{NO}$ = 4.7   IH = 0.9

Embodiment 36

Embodiment 36 is nearly identical to that of Embodiment 35 except that the visual field conversion optical element has a different design and, in this case, the first lens element ($r_3$–$r_4$) has a positive refractive power (thick lens conditions apply). As evident from Embodiments 35 and 36, the power of the first lens element may be either positive or negative.

TABLE 36

| # | R | D | $N_d$ | $\nu_d$ |
|---|---|---|---|---|
| Object | ∞ | 10.0000 | | |
| 1 | ∞ | 5.9000 | 1.88300 | 40.76 |
| 2 | ∞ | 0.0500 | | |
| 3 | 1.5896 | 1.2382 | 1.88300 | 40.76 |
| 4 | 1.3113 | 0.0492 | | |
| 5 (stop) | ∞ | 0.0300 | | |
| 6 | ∞ | 0.3500 | 1.51633 | 64.14 |
| 7 | ∞ | 0.0500 | | |
| 8 | ∞ | 0.3500 | 1.51633 | 64.14 |
| 9 | ∞ | 0.0300 | | |
| 10 | ∞ | 0.3974 | 1.88300 | 40.76 |
| 11 | −1.2362 | 0.4069 | | |
| 12 | ∞ | 1.0000 | 1.49400 | 75.00 |
| 13 | ∞ | 0.4000 | 1.51633 | 64.14 |
| 14 | ∞ | 0.0000 | | |
| Image | ∞ | 0.0000 | | |
| $F_{NO}$ = 4.7 | | | IH = 0.9 | |

The construction of Embodiment 34 is characterized by there being, sequentially from the object side, a first lens element of negative refractive power, a visual field conversion optical element, a second lens element of positive refractive power, a stop, and a third lens element of positive refractive power, with a convex-shaped surface on the image side, wherein the following condition is satisfied:

$$1.5 < f_3/IH < 5 \qquad \text{Condition (9)}$$

where $f_3$ is the focal distance of the third lens element, and

IH is the maximum image height.

In Embodiment 34, the value of $f_3$/IH equals 4.44, thus satisfying Condition (9).

The construction of Embodiments 35 and 36 is characterized by there being, sequentially from the object side, a visual field conversion optical element, a first lens element of positive or negative refractive power, a stop, and a second lens element of positive refractive power having a convex-shaped surface on the image side, wherein the following condition is satisfied:

$$1.5 < f_2/IH < 5 \qquad \text{Condition (10)}$$

where $f_2$ is the focal distance of the second lens element, and

IH is the maximum image height.

In Embodiments 35 and 36, the value of $f_2$/IH equals 1.56, thus satisfying Condition (10).

In Embodiments 34–36, because the master unit includes one positive lens element, the size of the master unit can be made very small Also, because the stop of the adaptor unit is arranged on the master unit side of the lens element more to the master unit side of the lens within the adaptor unit, the outer diameter of the positive lens element inside the master unit can be made small Furthermore, although dust can easily fall on a cover glass between the adaptor unit and the master unit when the two units are detached from each other, thereby influencing the image, by arranging the stop of the adaptor unit on the master unit side of the lens element more to the master unit side of the lens element within the adaptor unit, the light flux diameter in the dividing part can be made large, thereby reducing the influence of dust on the image. Because the adaptor unit also includes one or two lens elements, the adaptor unit size can be made compact.

Figure 37A:
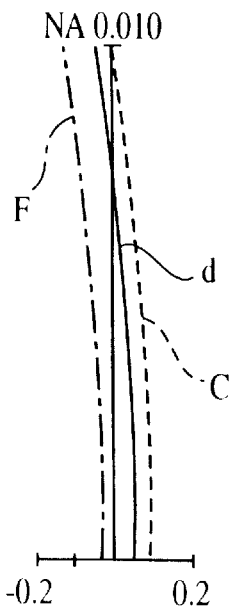
FIGS. 37A–37E show various aberrations of the lens of Embodiment 1.
Figure 37B:
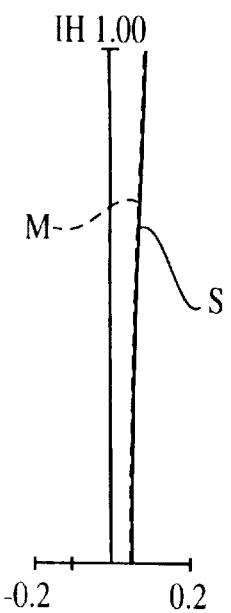
Figure 37C:
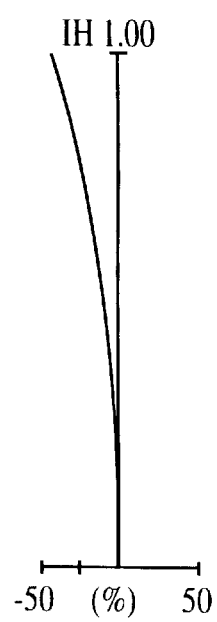
Figure 37D:
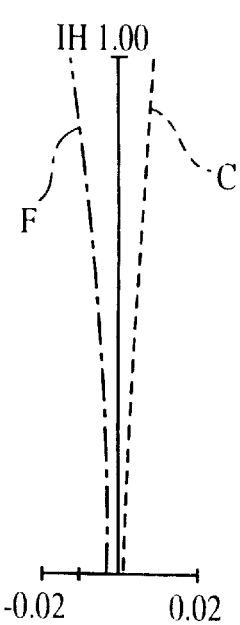
Figure 37E:
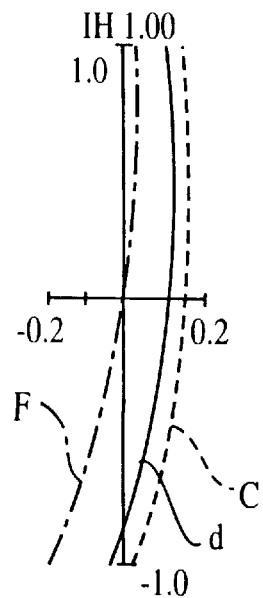
Figure 38A:
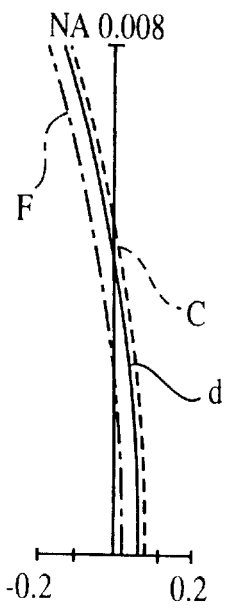
FIGS. 38A–38E show various aberrations of the lens of Embodiment 26.
Figure 38B:
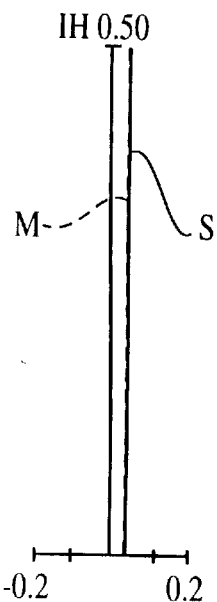
Figure 38C:
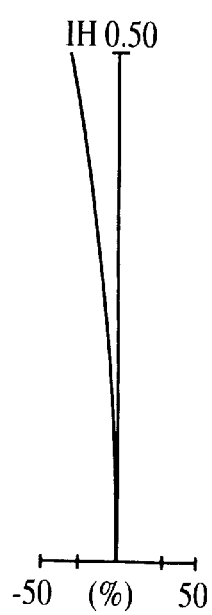
Figure 38D:
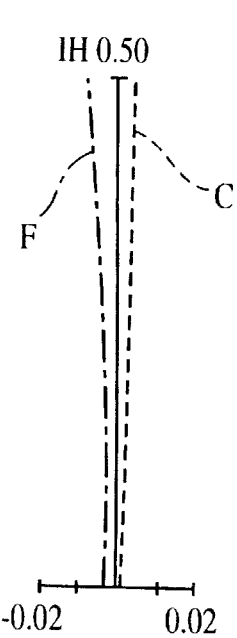
Figure 38E:
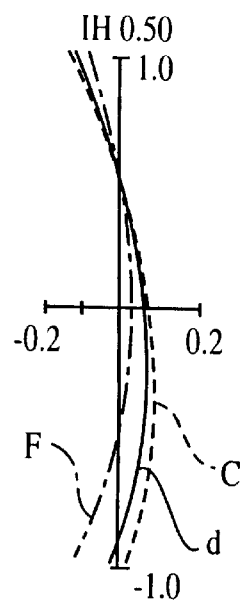

FIGS. 37A–37E show various aberrations of Embodiment 1. FIG. 37A shows the longitudinal spherical aberration, for the F, d and C lines. FIG. 37B shows the astigmatism in the Meridional M (i.e. tangential) and Sagittal S planes. FIG. 37C illustrates the distortion. FIG. 37D illustrates the lateral color for the C and F lines, and FIG. 37E illustrates the transverse spherical aberration for the F, d and C lines.

FIGS. 38A–38E show the same aberrations as discussed in the paragraph above, but the curves are for the aberrations of Embodiment 26.

Figure 39:
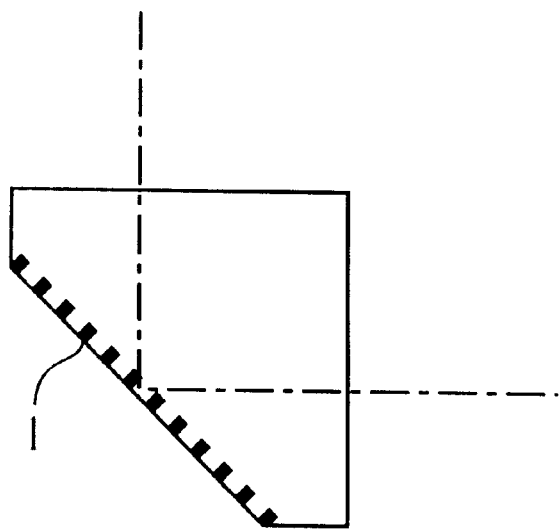
FIG. 39 shows a first example of a first visual field conversion optical element that may be used with the present invention.
Figure 40:
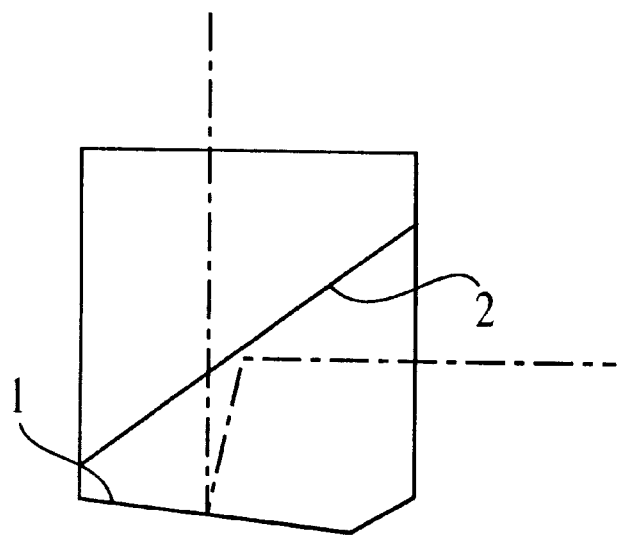
FIG. 40 shows a second example of a second visual field conversion optical element that may be used with the present invention.

FIG. 39 shows a visual field conversion optical element having a single reflecting surface 1. Such an arrangement inverts the image once by reflection from the roof surface of the prism However, if the roof prism is manufactured with poor accuracy, there is a disadvantage in that the accuracy of image formation will deteriorate remarkably. This can be a problem, especially when any of the length, width, or height of the visual field conversion optical element is 5 mm or less. In order to avoid such a disadvantage, a twice-reflecting prism as shown in FIG. 40 may be used. When a visual field conversion optical element as shown in FIG. 40 is used, any of the length, width, or height of the visual field conversion element may be smaller than 5 mm without a problem. In addition, such a visual field conversion element does not invert the image from left to right and vice-versa, as is the case in the visual field conversion element of FIG. 39. Of course, where the incident rays do not undergo total internal reflection, it is necessary to make the prism surface reflective by having, for example, a reflecting coating applied thereto.

Another visual field conversion optical element is illustrated in FIG. 41. Although a once-reflecting prism is used, the visual field conversion optical element has a favorable image-formation capability by virtue of there being electronic means or software provided to reverse the order of the data read with the image-pickup element.

In the objective optical system of the invention, the visual field conversion optical element allows direct views, side views, and oblique views to be directed to an image pick-up element, as illustrated in, for example, FIGS. 30, 31, and 33, respectively. Further, these views can be readily combined into a single image, as illustrated by the optical system in Japanese Laid Open Patent Application No. 37-9530.

The invention being thus described, it will be obvious that the same may be varied in many ways. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. An objective optical system comprising no more than three lens elements having refractive power, as follows, in relative order from the object side:

a first lens element of negative refractive power;

a visual field conversion optical element which folds light rays incident thereon;

a stop;

a second lens element of positive refractive power; and a third lens element of positive refractive power;

wherein the image side of the third lens element is of a convex shape and satisfies the following condition $$0.1 < |R_{(3R)}/f| < 20$$

where $R_{(3R)}$ is the radius of curvature of the image-side surface of the third lens element, and f is the focal distance of the objective optical system.

2. An objective optical system comprising, in relative order from the object side:

a first lens element of negative refractive power;

a visual field conversion optical element which folds light rays incident thereon;

a second lens element of positive refractive power; and a third lens element of positive refractive power;

wherein the object side of the third lens element is of a convex shape, and the objective optical system satisfies the following conditions $$\nu(p) > 42$$

$$N_1 > 1.6$$

where $\nu(p)$ is the Abbe number at the d-line of one of said second lens element or said third lens element, and $N_1$ is the index of refraction of the first lens element.

3. An objective optical system comprising, in relative order from the object side:

a first lens element of negative refractive power;

a visual field conversion optical element which folds light rays incident thereon;

a stop;

a second lens element of positive refractive power; and a third lens element of positive refractive power;

wherein said first lens element satisfies the following conditions $$N_1 > 1.6$$

$$0.1 < R_{(1R)}/f < 3$$

where $N_1$ is the index of refraction of the first lens element.

$R_{(1R)}$ is the radius of curvature of the image-side surface of the first lens element, and f is the focal distance of the objective optical system.

4. An objective optical system comprising no more than two lens elements having refractive power, as follows, in relative order from the object side:

a first lens element of negative refractive power;

a visual field conversion optical element which folds light rays incident thereon;

a stop; and a second lens element of positive refractive power;

wherein the first lens element satisfies the following condition $$0.05 < |f/f_1| < 5$$

where f is the focal distance of the objective optical system, and $f_1$ is the focal distance of the first lens element.

5. The objective optical system of claim 1, wherein at least one of the lens elements of positive refractive power includes one surface that is planar and an opposite surface that is convex, with the convex surface thereof satisfying the following condition $$0.5 \text{ mm} < |R(p)| < 5 \text{ mm}$$

where

R(p) is the radius of curvature of said opposite surface that is convex.

6. The objective optical system of claim 2, wherein at least one of the lens elements of positive refractive power includes one surface that is planar and an opposite surface that is convex, with the convex surface thereof satisfying the following condition $$0.5 \text{ mm} < |R(p)| < 5 \text{ mm}$$

where

R(p) is the radius of curvature of said opposite surface that is convex.

7. The objective optical system of claim 3, wherein at least one of the lens elements of positive refractive power includes one surface that is planar and an opposite surface that is convex, with the convex surface thereof satisfying the following condition $$0.5 \text{ mm} < |R(p)| < 5 \text{ mm}$$

where

R(p) is the radius of curvature of said opposite surface that is convex.

8. The objective optical system of claim 4, wherein at least one of the lens elements of positive refractive power includes one surface that is planar and an opposite surface that is convex, with the convex surface thereof satisfying the following condition $$0.5 \text{ mm} < |R(p)| < 5 \text{ mm}$$

where

R(p) is the radius of curvature of said opposite surface that is convex.

9. The objective optical system of claim 1, in combination with an image pick-up element having a pixel size of 5 micrometers or less.

10. The objective optical system of claim 2, in combination with an image pick-up element having a pixel size of 5 micrometers or less.

11. The objective optical system of claim 3, in combination with an image pick-up element having a pixel size of 5 micrometers or less.

12. The objective optical system of claim 4, in combination with an image pick-up element having a pixel size of 5 micrometers or less.

13. The objective optical system of claim 1, wherein one of the lens elements of positive refractive power has an outer diameter of 3 mm or less.

14. The objective optical system of claim 2, wherein one of the lens elements of positive refractive power has an outer diameter of 3 mm or less.

15. The objective optical system of claim 3, wherein one of the lens elements of positive refractive power has an outer diameter of 3 mm or less.

16. The objective optical system of claim 4, wherein one of the lens elements of positive refractive power has an outer diameter of 3 mm or less.

17. The objective optical system of claim 4, wherein the index of refraction of the first lens element is greater than 1.6.

18. An objective optical system, comprising, in relative order from the object side:

a first lens element of negative refractive power;

a visual field conversion optical element which folds light rays incident thereon;

a second lens element of positive refractive power;

a stop;

a third lens element of positive refractive power and having a convex-shaped surface on the image side, wherein the following condition is satisfied $$1.5 < f_3/IH < 5$$

where $f_3$ is the focal distance of the third lens element, and

IH is the maximum image height.

19. The objective optical system of claim 18, wherein said objective optical system is formed of two parts comprising, in relative order from the object side:
   an adaptor unit formed of
      said first lens element,
      said visual field conversion optical element,
      said second lens element, and
      said stop; and
   a master unit, detachable from said adaptor unit, formed of
      said third lens element.

20. An objective optical system comprising, in relative order from the object side:

a visual field conversion optical element which folds light rays incident thereon;

a first lens element of positive or negative refractive power;

a stop;

a second lens element of positive refractive power and having a convex surface on the image side, wherein the following condition is satisfied $$1.5 < f_2/IH < 5$$

where $f_2$ is the focal distance of the second lens element, and

IH is the maximum image height.

21. The objective optical system of claim 20, wherein said objective optical system is formed of two parts comprising, in relative order from the object side:
   an adaptor unit formed of
      said visual field conversion optical element
      said first lens element, and
      said stop; and
   a master unit, detachable from said adaptor unit, formed of
      said second lens element.

* * * * *

UNITED STATES PATENT AND TRADEMARK OFFICE
CERTIFICATE OF CORRECTION

PATENT NO. : 6,256,155 B1
DATED : July 3, 2001
INVENTOR(S) : Nagaoka

It is certified that error appears in the above-identified patent and that said Letters Patent is hereby corrected as shown below:

Column 5,
Line 1, change "desirable" to -- desirably --;
Line 39, insert -- a -- before "CCD";

Column 14,
Line 1, change "$r_{16}14r_{17}$" to -- $r_{16}-r_{17}$ --;

Column 15,
Lne 24, change "$(r_{15} - r_6)$" to -- $(r_{15}-r_{16})$ --;

Column 21,
Line 49, after "2 mm" insert a period;

Column 25,
Line 26, after "applied" insert -- to --;

Column 28,
Line 65, change "$(r_{10}-r_1)$" to -- $(r_{10}-r_{11})$;

Column 30,
Line 28, change "$(r_{13}-_{14})$" to -- $(r_{13} - r_{14})$ --;

Column 32,
Line 66, change "$0.1 < | R_{(3R)} / f < 20$" to -- $0.1 < | R_{(3R)} / f | < 20$ --;

Column 33,
Line 42, change the period after "element" to a comma; and

UNITED STATES PATENT AND TRADEMARK OFFICE
CERTIFICATE OF CORRECTION

PATENT NO. : 6,256,155 B1
DATED : July 3, 2001
INVENTOR(S) : Nagaoka

It is certified that error appears in the above-identified patent and that said Letters Patent is hereby corrected as shown below:

<u>Column 36,</u>
Line 20, add a comma after "element".

Signed and Sealed this

Twenty-third Day of April, 2002

Attest:

*Attesting Officer*

JAMES E. ROGAN
*Director of the United States Patent and Trademark Office*